United States Patent
Damnjanovic

(10) Patent No.: US 8,830,818 B2
(45) Date of Patent: Sep. 9, 2014

(54) FORWARD HANDOVER UNDER RADIO LINK FAILURE

(75) Inventor: Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 12/135,016

(22) Filed: Jun. 6, 2008

(65) Prior Publication Data

US 2009/0046573 A1 Feb. 19, 2009

Related U.S. Application Data

(60) Provisional application No. 60/942,661, filed on Jun. 7, 2007.

(51) Int. Cl.
*G01R 31/08* (2006.01)
*H04W 4/00* (2009.01)

(52) U.S. Cl.
USPC .......................................... 370/217; 370/329

(58) Field of Classification Search
USPC ................................................. 370/217, 329
See application file for complete search history.

(56) References Cited

U.S. PATENT DOCUMENTS

| | | | |
|---|---|---|---|
| 4,833,701 | A | 5/1989 | Comroe et al. |
| 5,117,502 | A | 5/1992 | Onoda et al. |
| 5,128,938 | A | 7/1992 | Borras |
| 5,200,952 | A | 4/1993 | Bernstein et al. |
| 5,208,837 | A | 5/1993 | Richey |
| 5,229,992 | A | 7/1993 | Jurkevich et al. |
| 5,247,516 | A | 9/1993 | Bernstein et al. |
| 5,251,209 | A | 10/1993 | Jurkevich et al. |
| 5,267,261 | A | 11/1993 | Blakeney, II et al. |
| 5,268,933 | A | 12/1993 | Averbuch |
| 5,388,102 | A | 2/1995 | Griffith et al. |

(Continued)

FOREIGN PATENT DOCUMENTS

| | | |
|---|---|---|
| AU | 2002353616 | 5/2003 |
| CL | 36022006 | 6/2007 |

(Continued)

OTHER PUBLICATIONS

International Search Report, PCT/US2008/066352—International Search Authority—European Patent Office—Nov. 5, 2008.
Written Opinion. PCT/US2008/066352—International Search Authority—European Patent Office—Nov. 5, 2008.

(Continued)

*Primary Examiner* — Mark Rinehart
*Assistant Examiner* — Angel Brockman
(74) *Attorney, Agent, or Firm* — Liem T. Do

(57) ABSTRACT

System(s) and method(s) are provided for forward handover under radio link failure. A configurable criterion for radio link failure (RLF) is established through a reference threshold for a channel quality metric; the threshold ($CQI_{TH}$) can be determined at least on a quality-of-service basis or a per-terminal basis. A low-overhead indication of RLF is conveyed as a NULL CQI when the channel quality metric is below threshold. Onset of RLF triggers preparation of forward handover (FHO) at a terminal within a predetermined timer, during which normal service can resume if link quality recovers above $CQI_{TH}$. Forward handover is pursued once timer elapses. Preparation at the terminal can be complemented by preparation implemented in advanced to RLF condition, in accordance to a disparate threshold applied to terminal's measurements. Preparation of FHO includes backhaul exchange of operational information like buffered data, and context.

53 Claims, 14 Drawing Sheets

(56) References Cited

U.S. PATENT DOCUMENTS

| | | | | |
|---|---|---|---|---|
| 5,490,139 | A | 2/1996 | Baker et al. | |
| 5,491,835 | A | 2/1996 | Sasuta et al. | |
| 5,509,027 | A | 4/1996 | Vook et al. | |
| 5,539,925 | A | 7/1996 | Yli-Kotila et al. | |
| 5,561,841 | A * | 10/1996 | Markus | 455/446 |
| 5,572,528 | A | 11/1996 | Shuen | |
| 5,574,720 | A | 11/1996 | Lee | |
| 5,594,943 | A * | 1/1997 | Balachandran | 455/436 |
| 5,694,548 | A | 12/1997 | Baugher et al. | |
| 5,722,044 | A | 2/1998 | Padovani et al. | |
| 5,737,328 | A | 4/1998 | Norman et al. | |
| 5,794,137 | A | 8/1998 | Harte | |
| 5,854,785 | A | 12/1998 | Willey | |
| 5,870,427 | A | 2/1999 | Tiedemann, Jr. et al. | |
| 5,974,036 | A | 10/1999 | Acharya et al. | |
| 5,978,366 | A | 11/1999 | Massingill et al. | |
| 6,016,316 | A | 1/2000 | Moura et al. | |
| 6,018,521 | A | 1/2000 | Timbs et al. | |
| 6,031,863 | A | 2/2000 | Jusa et al. | |
| 6,034,950 | A | 3/2000 | Sauer et al. | |
| 6,049,543 | A | 4/2000 | Sauer et al. | |
| 6,055,428 | A | 4/2000 | Soliman | |
| 6,073,021 | A | 6/2000 | Kumar et al. | |
| 6,084,969 | A | 7/2000 | Wright et al. | |
| 6,094,427 | A | 7/2000 | Yi | |
| 6,097,952 | A | 8/2000 | Kawabata | |
| 6,101,394 | A | 8/2000 | Illidge | |
| 6,137,787 | A | 10/2000 | Chawla et al. | |
| 6,144,671 | A | 11/2000 | Perinpanathan et al. | |
| 6,151,502 | A | 11/2000 | Padovani et al. | |
| 6,157,668 | A | 12/2000 | Gilhousen et al. | |
| 6,157,833 | A | 12/2000 | Lawson-Jenkins et al. | |
| 6,157,978 | A | 12/2000 | Ng et al. | |
| 6,161,008 | A | 12/2000 | Lee et al. | |
| 6,163,692 | A | 12/2000 | Chakrabarti et al. | |
| 6,195,552 | B1 | 2/2001 | Jeong et al. | |
| 6,195,705 | B1 | 2/2001 | Leung | |
| 6,201,971 | B1 | 3/2001 | Purnadi et al. | |
| 6,256,300 | B1 | 7/2001 | Ahmed et al. | |
| 6,272,129 | B1 | 8/2001 | Dynarski et al. | |
| 6,285,665 | B1 | 9/2001 | Chuah | |
| 6,300,887 | B1 | 10/2001 | Le | |
| 6,308,267 | B1 | 10/2001 | Gremmelmaier | |
| 6,345,043 | B1 | 2/2002 | Hsu | |
| 6,347,091 | B1 | 2/2002 | Wallentin et al. | |
| 6,360,100 | B1 | 3/2002 | Grob et al. | |
| 6,366,561 | B1 | 4/2002 | Bender | |
| 6,370,380 | B1 | 4/2002 | Norefors et al. | |
| 6,397,065 | B1 | 5/2002 | Huusko et al. | |
| 6,400,722 | B1 | 6/2002 | Chuah et al. | |
| 6,445,922 | B1 | 9/2002 | Hiller et al. | |
| 6,446,127 | B1 | 9/2002 | Schuster et al. | |
| 6,449,481 | B1 * | 9/2002 | Kwon et al. | 455/437 |
| 6,456,604 | B1 | 9/2002 | Lee et al. | |
| 6,466,964 | B1 | 10/2002 | Leung et al. | |
| 6,473,418 | B1 | 10/2002 | Laroia et al. | |
| 6,493,725 | B1 | 12/2002 | Iwai et al. | |
| 6,496,704 | B2 | 12/2002 | Yuan | |
| 6,510,153 | B1 | 1/2003 | Inoue et al. | |
| 6,516,352 | B1 | 2/2003 | Booth et al. | |
| 6,519,457 | B1 | 2/2003 | Jiang et al. | |
| 6,529,732 | B1 | 3/2003 | Vainiomaki et al. | |
| 6,535,493 | B1 | 3/2003 | Lee et al. | |
| 6,553,227 | B1 | 4/2003 | Ho et al. | |
| 6,587,680 | B1 * | 7/2003 | Ala-Laurila et al. | 455/411 |
| 6,611,547 | B1 | 8/2003 | Rauhala | |
| 6,640,248 | B1 | 10/2003 | Jorgensen | |
| 6,654,363 | B1 | 11/2003 | Li et al. | |
| 6,671,512 | B2 * | 12/2003 | Laakso | 455/453 |
| 6,701,155 | B2 | 3/2004 | Sarkkinen et al. | |
| 6,708,031 | B2 | 3/2004 | Purnadi et al. | |
| 6,714,524 | B1 | 3/2004 | Kim et al. | |
| 6,714,777 | B1 | 3/2004 | Naqvi et al. | |
| 6,714,788 | B2 | 3/2004 | Voyer | |
| 6,728,365 | B1 | 4/2004 | Li et al. | |
| 6,754,492 | B1 | 6/2004 | Stammers et al. | |
| 6,763,007 | B1 | 7/2004 | La Porta et al. | |
| 6,768,908 | B1 | 7/2004 | Jalloul et al. | |
| 6,771,962 | B2 | 8/2004 | Saifullah et al. | |
| 6,785,256 | B2 | 8/2004 | O'neill | |
| 6,807,421 | B1 | 10/2004 | Ahmavaara | |
| 6,842,621 | B2 * | 1/2005 | Labun et al. | 455/456.3 |
| 6,842,630 | B2 | 1/2005 | Periyalwar | |
| 6,862,446 | B2 | 3/2005 | Oneill et al. | |
| 6,901,063 | B2 | 5/2005 | Vayanos et al. | |
| 6,917,605 | B2 | 7/2005 | Kakemizu et al. | |
| 6,937,566 | B1 | 8/2005 | Forslow | |
| 6,947,401 | B2 | 9/2005 | El-Malki et al. | |
| 6,950,650 | B2 | 9/2005 | Roeder | |
| 6,954,442 | B2 | 10/2005 | Tsirtsis et al. | |
| 6,961,579 | B2 | 11/2005 | Inukai et al. | |
| 6,965,585 | B2 | 11/2005 | Grilli et al. | |
| 6,970,445 | B2 | 11/2005 | Oneill et al. | |
| 6,990,088 | B2 | 1/2006 | Madour | |
| 6,990,337 | B2 | 1/2006 | Oneill et al. | |
| 6,990,339 | B2 | 1/2006 | Turanyi et al. | |
| 6,990,343 | B2 | 1/2006 | Lefkowitz | |
| 6,992,994 | B2 | 1/2006 | Das et al. | |
| 6,993,332 | B2 * | 1/2006 | Pedersen et al. | 455/436 |
| 7,003,311 | B2 | 2/2006 | Ebata et al. | |
| 7,006,826 | B2 | 2/2006 | Cao et al. | |
| 7,016,317 | B1 | 3/2006 | Pathak et al. | |
| 7,027,400 | B2 | 4/2006 | O'Neill | |
| 7,027,449 | B2 | 4/2006 | Garcia-Luna-Aceves et al. | |
| 7,047,009 | B2 | 5/2006 | Laroia et al. | |
| 7,068,640 | B2 | 6/2006 | Kakemizu et al. | |
| 7,068,654 | B1 | 6/2006 | Joseph et al. | |
| 7,069,040 | B2 | 6/2006 | Iwanaga et al. | |
| 7,089,008 | B1 | 8/2006 | Back et al. | |
| 7,116,654 | B2 | 10/2006 | Kim | |
| 7,123,599 | B2 | 10/2006 | Yano et al. | |
| 7,130,291 | B1 | 10/2006 | Kim et al. | |
| 7,161,913 | B2 | 1/2007 | Jung | |
| 7,177,641 | B1 | 2/2007 | Miernik et al. | |
| 7,184,771 | B1 | 2/2007 | Mouly et al. | |
| 7,197,318 | B2 * | 3/2007 | Schwarz et al. | 455/453 |
| 7,233,583 | B2 | 6/2007 | Asthana et al. | |
| 7,233,794 | B2 | 6/2007 | Grob et al. | |
| 7,263,357 | B2 | 8/2007 | Lee et al. | |
| 7,266,100 | B2 | 9/2007 | Le et al. | |
| 7,272,122 | B2 | 9/2007 | Trossen et al. | |
| 7,283,495 | B2 | 10/2007 | Lee et al. | |
| 7,283,511 | B2 | 10/2007 | Hans et al. | |
| 7,290,063 | B2 | 10/2007 | Kalliokulju et al. | |
| 7,315,554 | B2 | 1/2008 | Baum et al. | |
| 7,330,542 | B2 | 2/2008 | Kauhanen et al. | |
| 7,336,953 | B2 | 2/2008 | Kim et al. | |
| 7,369,855 | B2 | 5/2008 | Oneill et al. | |
| 7,369,859 | B2 | 5/2008 | Gallagher | |
| 7,376,101 | B2 | 5/2008 | Shim et al. | |
| 7,389,110 | B2 | 6/2008 | Lee | |
| 7,391,741 | B2 | 6/2008 | Kang | |
| 7,403,789 | B2 | 7/2008 | Takano et al. | |
| 7,408,917 | B1 | 8/2008 | Kyung et al. | |
| 7,408,950 | B2 | 8/2008 | Okuyama | |
| 7,409,428 | B1 | 8/2008 | Brabec et al. | |
| 7,418,264 | B2 | 8/2008 | Kim | |
| 7,420,957 | B2 | 9/2008 | Kim et al. | |
| 7,460,504 | B2 | 12/2008 | Tsirtsis et al. | |
| 7,492,762 | B2 | 2/2009 | Chowdhury | |
| 7,499,401 | B2 | 3/2009 | Buddhikot et al. | |
| 7,505,765 | B2 | 3/2009 | Frangione et al. | |
| 7,515,561 | B2 | 4/2009 | Koodli et al. | |
| 7,529,239 | B2 | 5/2009 | Seppanen | |
| 7,567,639 | B2 | 7/2009 | Huh et al. | |
| 7,583,592 | B2 | 9/2009 | Park et al. | |
| 7,593,364 | B2 | 9/2009 | Asthana | |
| 7,653,415 | B2 | 1/2010 | Van Rooyen | |
| 7,668,541 | B2 | 2/2010 | Oneill et al. | |
| 7,672,254 | B2 | 3/2010 | Kim et al. | |
| 7,702,309 | B2 | 4/2010 | Faccin et al. | |
| 7,706,739 | B2 | 4/2010 | Kjellberg | |
| 7,729,350 | B2 | 6/2010 | Singh et al. | |
| 7,742,781 | B2 | 6/2010 | Chen et al. | |

(56) References Cited

U.S. PATENT DOCUMENTS

| | | |
|---|---|---|
| 7,773,947 B2 | 8/2010 | Gerlach |
| 7,962,142 B2 | 6/2011 | Oneill et al. |
| 8,112,102 B2 | 2/2012 | Fischer |
| 8,144,664 B2 | 3/2012 | Pani et al. |
| 8,165,587 B2 | 4/2012 | Dahlen et al. |
| 8,184,615 B2 | 5/2012 | Tsirtsis et al. |
| 8,229,120 B2 | 7/2012 | Iwamura et al. |
| 8,588,777 B2 | 11/2013 | Grob et al. |
| 2001/0019545 A1 | 9/2001 | Okubo et al. |
| 2002/0061009 A1 | 5/2002 | Sorensen |
| 2002/0064144 A1 | 5/2002 | Einola et al. |
| 2002/0065785 A1 | 5/2002 | Tsuda |
| 2002/0067706 A1 | 6/2002 | Bautz et al. |
| 2002/0075859 A1 | 6/2002 | Mizell et al. |
| 2002/0082038 A1 | 6/2002 | Mochizuki |
| 2002/0085518 A1 | 7/2002 | Lim |
| 2002/0107908 A1 | 8/2002 | Dharanikota |
| 2002/0126701 A1 | 9/2002 | Requena |
| 2002/0136226 A1 | 9/2002 | Christoffel et al. |
| 2002/0161927 A1 | 10/2002 | Inoue et al. |
| 2002/0168982 A1 | 11/2002 | Sorokine et al. |
| 2002/0199012 A1 | 12/2002 | Cable et al. |
| 2003/0009580 A1 | 1/2003 | Chen et al. |
| 2003/0009582 A1 | 1/2003 | Qiao et al. |
| 2003/0018774 A1 | 1/2003 | Flinck et al. |
| 2003/0026220 A1 | 2/2003 | Uhlik et al. |
| 2003/0027572 A1 | 2/2003 | Karlsson et al. |
| 2003/0032430 A1 | 2/2003 | Lee |
| 2003/0036392 A1 | 2/2003 | Yukie |
| 2003/0078047 A1 | 4/2003 | Lee et al. |
| 2003/0092444 A1 | 5/2003 | Sengodan et al. |
| 2003/0103496 A1 | 6/2003 | Lakshmi Narayanan et al. |
| 2003/0104814 A1 | 6/2003 | Gwon et al. |
| 2003/0112766 A1 | 6/2003 | Riedel et al. |
| 2003/0119516 A1 | 6/2003 | Tomishima et al. |
| 2003/0204599 A1 | 10/2003 | Trossen et al. |
| 2003/0212764 A1 | 11/2003 | Trossen et al. |
| 2003/0214922 A1 | 11/2003 | Shahrier |
| 2003/0216140 A1 | 11/2003 | Chambert |
| 2003/0217096 A1 | 11/2003 | McKelvie et al. |
| 2003/0227871 A1 | 12/2003 | Hsu et al. |
| 2003/0236103 A1 | 12/2003 | Tamaki et al. |
| 2004/0002362 A1 | 1/2004 | Chuah et al. |
| 2004/0004736 A1 | 1/2004 | Ogura et al. |
| 2004/0004967 A1 | 1/2004 | Nakatsugawa et al. |
| 2004/0008632 A1 | 1/2004 | Hsu et al. |
| 2004/0015607 A1 | 1/2004 | Bender et al. |
| 2004/0016551 A1 | 1/2004 | Bennett |
| 2004/0017792 A1 | 1/2004 | Khaleghi et al. |
| 2004/0017798 A1 | 1/2004 | Hurtta et al. |
| 2004/0018841 A1 | 1/2004 | Trossen |
| 2004/0076186 A1 | 4/2004 | Chen et al. |
| 2004/0087319 A1 | 5/2004 | Bos et al. |
| 2004/0090913 A1 | 5/2004 | Scudder et al. |
| 2004/0090937 A1 | 5/2004 | Chaskar et al. |
| 2004/0104544 A1 | 6/2004 | Fan et al. |
| 2004/0116153 A1 | 6/2004 | Kaminski et al. |
| 2004/0120317 A1 | 6/2004 | Forssell |
| 2004/0139201 A1 | 7/2004 | Chaudhary et al. |
| 2004/0151148 A1 | 8/2004 | Yahagi |
| 2004/0151193 A1 | 8/2004 | Rune et al. |
| 2004/0165551 A1 | 8/2004 | Krishnamurthi et al. |
| 2004/0166898 A1 | 8/2004 | Tajima |
| 2004/0179544 A1 | 9/2004 | Wilson et al. |
| 2004/0192307 A1 | 9/2004 | Watanabe et al. |
| 2004/0218607 A1 | 11/2004 | Hurtta et al. |
| 2004/0228301 A1 | 11/2004 | Rudolf et al. |
| 2004/0228304 A1 | 11/2004 | Riedel et al. |
| 2004/0242222 A1 | 12/2004 | An et al. |
| 2004/0253954 A1 | 12/2004 | Lee et al. |
| 2005/0020262 A1 | 1/2005 | Kim |
| 2005/0020265 A1 | 1/2005 | Funabiki et al. |
| 2005/0053043 A1 | 3/2005 | Rudolf et al. |
| 2005/0058151 A1 | 3/2005 | Yeh |
| 2005/0059417 A1 | 3/2005 | Zhang et al. |
| 2005/0063338 A1 | 3/2005 | Tsui |
| 2005/0063389 A1 | 3/2005 | Elliott et al. |
| 2005/0079823 A1 | 4/2005 | Kurek et al. |
| 2005/0089043 A1 | 4/2005 | Seckin et al. |
| 2005/0128949 A1 | 6/2005 | Ku et al. |
| 2005/0128990 A1 | 6/2005 | Eom et al. |
| 2005/0141468 A1 | 6/2005 | Kim et al. |
| 2005/0201324 A1 | 9/2005 | Zheng |
| 2005/0265303 A1 | 12/2005 | Edwards et al. |
| 2005/0268153 A1 | 12/2005 | Armstrong et al. |
| 2006/0002344 A1 | 1/2006 | Ono et al. |
| 2006/0003768 A1* | 1/2006 | Chiou ............... 455/436 |
| 2006/0007936 A1 | 1/2006 | Shrum et al. |
| 2006/0029028 A1 | 2/2006 | Kim et al. |
| 2006/0056348 A1 | 3/2006 | Marinier et al. |
| 2006/0069809 A1 | 3/2006 | Serlet |
| 2006/0099950 A1 | 5/2006 | Klein et al. |
| 2006/0104232 A1 | 5/2006 | Gidwani |
| 2006/0121883 A1 | 6/2006 | Faccin |
| 2006/0149845 A1 | 7/2006 | Malin et al. |
| 2006/0217119 A1 | 9/2006 | Bosch et al. |
| 2006/0230019 A1 | 10/2006 | Hill et al. |
| 2006/0245394 A1* | 11/2006 | Baba et al. ............... 370/331 |
| 2006/0268924 A1 | 11/2006 | Marinier et al. |
| 2006/0285520 A1 | 12/2006 | Venkitaraman |
| 2007/0016637 A1 | 1/2007 | Brawn et al. |
| 2007/0019584 A1 | 1/2007 | Qi et al. |
| 2007/0064948 A1 | 3/2007 | Tsirtsis et al. |
| 2007/0066918 A1 | 3/2007 | Dewald et al. |
| 2007/0076653 A1 | 4/2007 | Park et al. |
| 2007/0076658 A1 | 4/2007 | Park et al. |
| 2007/0078999 A1 | 4/2007 | Corson et al. |
| 2007/0083669 A1 | 4/2007 | Tsirtsis et al. |
| 2007/0086389 A1 | 4/2007 | Park et al. |
| 2007/0091810 A1 | 4/2007 | Kim et al. |
| 2007/0099618 A1* | 5/2007 | Kim ............... 455/436 |
| 2007/0105555 A1 | 5/2007 | Miernik et al. |
| 2007/0105584 A1 | 5/2007 | Grob et al. |
| 2007/0121542 A1 | 5/2007 | Lohr et al. |
| 2007/0147283 A1 | 6/2007 | Laroia et al. |
| 2007/0147286 A1 | 6/2007 | Laroia et al. |
| 2007/0147377 A1 | 6/2007 | Laroia et al. |
| 2007/0171875 A1 | 7/2007 | Suda |
| 2007/0189282 A1 | 8/2007 | Lohr et al. |
| 2007/0191054 A1 | 8/2007 | Das et al. |
| 2007/0191065 A1* | 8/2007 | Lee et al. ............... 455/562.1 |
| 2007/0195788 A1 | 8/2007 | Vasamsetti et al. |
| 2008/0019293 A1 | 1/2008 | Chang et al. |
| 2008/0031198 A1 | 2/2008 | Hwang et al. |
| 2008/0051091 A1 | 2/2008 | Phan et al. |
| 2008/0074994 A1* | 3/2008 | Jen ............... 370/218 |
| 2008/0076424 A1 | 3/2008 | Barber et al. |
| 2008/0089287 A1 | 4/2008 | Sagfors et al. |
| 2008/0146231 A1* | 6/2008 | Huang et al. ............... 455/436 |
| 2008/0160999 A1 | 7/2008 | Eklund |
| 2008/0240039 A1 | 10/2008 | Parekh et al. |
| 2008/0242292 A1 | 10/2008 | Koskela et al. |
| 2008/0253332 A1 | 10/2008 | Ore et al. |
| 2008/0259855 A1 | 10/2008 | Yoon et al. |
| 2008/0261600 A1 | 10/2008 | Somasundaram et al. |
| 2009/0029706 A1 | 1/2009 | Prakash et al. |
| 2009/0175448 A1 | 7/2009 | Watanabe et al. |
| 2009/0181673 A1* | 7/2009 | Barrett ............... 455/436 |
| 2009/0190556 A1 | 7/2009 | Venkitaraman |
| 2009/0191878 A1 | 7/2009 | Hedqvist et al. |
| 2009/0274086 A1 | 11/2009 | Petrovic et al. |
| 2009/0285218 A1 | 11/2009 | Adamczyk et al. |
| 2010/0080126 A1 | 4/2010 | Higashida |
| 2011/0019614 A1 | 1/2011 | Oneill et al. |
| 2011/0039546 A1 | 2/2011 | Narasimha et al. |
| 2011/0039552 A1 | 2/2011 | Narasimha et al. |
| 2011/0051660 A1 | 3/2011 | Arora et al. |
| 2011/0103347 A1 | 5/2011 | Dimou |
| 2011/0250892 A1 | 10/2011 | Gupta et al. |
| 2011/0268085 A1 | 11/2011 | Barany et al. |
| 2012/0087312 A1 | 4/2012 | Laroia et al. |
| 2012/0327908 A1 | 12/2012 | Gupta et al. |
| 2013/0208709 A1 | 8/2013 | Corson et al. |
| 2013/0294324 A1 | 11/2013 | Corson et al. |

(56) References Cited

U.S. PATENT DOCUMENTS

FOREIGN PATENT DOCUMENTS

| | | |
|---|---|---|
| CL | 36052006 | 6/2007 |
| CL | 36032006 | 7/2007 |
| CL | 36042006 | 7/2007 |
| CN | 1043052 A | 6/1990 |
| CN | 1344477 | 4/2002 |
| CN | 1345518 A | 4/2002 |
| CN | 1416284 A | 5/2003 |
| CN | 1481119 A | 3/2004 |
| CN | 1514607 | 7/2004 |
| CN | 1650178 | 8/2005 |
| CN | 1859529 A | 11/2006 |
| EP | 0740440 A2 | 10/1996 |
| EP | 0813346 A1 | 12/1997 |
| EP | 0974895 A2 | 1/2000 |
| EP | 1088463 A1 | 4/2001 |
| EP | 1128704 A1 | 8/2001 |
| EP | 1345370 A2 | 9/2003 |
| EP | 1458209 A2 | 9/2004 |
| EP | 1473872 A2 | 11/2004 |
| EP | 1489808 A2 | 12/2004 |
| EP | 1507421 A1 | 2/2005 |
| EP | 1565024 A2 | 8/2005 |
| EP | 1720267 A1 | 11/2006 |
| EP | 1764942 A2 | 3/2007 |
| GB | 2322046 | 8/1998 |
| GB | 2395629 A | 5/2004 |
| JP | 2084807 | 3/1990 |
| JP | 08116329 | 5/1996 |
| JP | 11308273 | 11/1999 |
| JP | 2000125343 A | 4/2000 |
| JP | 2001217830 A | 8/2001 |
| JP | 2001237878 A | 8/2001 |
| JP | 2001245355 | 9/2001 |
| JP | 2002111732 A | 4/2002 |
| JP | 2002513527 A | 5/2002 |
| JP | 2002165249 A | 6/2002 |
| JP | 2002281069 A | 9/2002 |
| JP | 2002281539 A | 9/2002 |
| JP | 2002534923 T | 10/2002 |
| JP | 2002537739 | 11/2002 |
| JP | 2003060685 A | 2/2003 |
| JP | 2003111134 A | 4/2003 |
| JP | 2003348007 | 5/2003 |
| JP | 2003304571 A | 10/2003 |
| JP | 2003338833 A | 11/2003 |
| JP | 2004007578 A | 1/2004 |
| JP | 2004104544 A | 4/2004 |
| JP | 2004147228 | 5/2004 |
| JP | 2004201289 A | 7/2004 |
| JP | 2004328637 A | 11/2004 |
| JP | 2005531173 T | 10/2005 |
| JP | 2007513569 | 5/2007 |
| JP | 2007521759 | 8/2007 |
| JP | 2007527177 T | 9/2007 |
| JP | 2008053889 A | 3/2008 |
| JP | 4827994 B1 | 11/2011 |
| KR | 20040004918 A | 1/2004 |
| KR | 20040105069 A | 12/2004 |
| KR | 20050023194 A | 3/2005 |
| KR | 20050065123 | 6/2005 |
| KR | 20050066287 A | 6/2005 |
| KR | 20070031810 A | 3/2007 |
| RU | 2117396 C1 | 8/1998 |
| RU | 2003120063 A | 2/2005 |
| RU | 2256299 C2 | 7/2005 |
| RU | 2005115564 A | 11/2005 |
| RU | 2267864 | 1/2006 |
| RU | 2005129079 A | 2/2006 |
| RU | 2292669 | 1/2007 |
| RU | 2294596 C2 | 2/2007 |
| TW | 200527930 | 8/2005 |
| TW | 200708018 | 2/2007 |
| WO | 9501706 A1 | 1/1995 |
| WO | WO9512297 | 5/1995 |
| WO | 9804094 A1 | 1/1998 |
| WO | WO9833288 | 7/1998 |
| WO | WO9847302 | 10/1998 |
| WO | WO9856140 A2 | 12/1998 |
| WO | WO9905828 A1 | 2/1999 |
| WO | 9927718 | 6/1999 |
| WO | WO9966748 A1 | 12/1999 |
| WO | WO0018173 | 3/2000 |
| WO | WO0041401 | 7/2000 |
| WO | WO0041426 A1 | 7/2000 |
| WO | WO0128160 A2 | 4/2001 |
| WO | WO0158196 A1 | 8/2001 |
| WO | WO0163947 | 8/2001 |
| WO | WO0178440 | 10/2001 |
| WO | WO0219746 A1 | 3/2002 |
| WO | WO0243409 A2 | 5/2002 |
| WO | WO0247407 A2 | 6/2002 |
| WO | WO02056551 A1 | 7/2002 |
| WO | WO03007484 A2 | 1/2003 |
| WO | WO03017582 | 2/2003 |
| WO | WO03092316 A1 | 11/2003 |
| WO | WO03098816 A2 | 11/2003 |
| WO | 03105516 | 12/2003 |
| WO | 2004039022 A2 | 5/2004 |
| WO | WO2004068739 A1 | 8/2004 |
| WO | WO2004070989 | 8/2004 |
| WO | WO2004075468 A2 | 9/2004 |
| WO | WO2004079949 A1 | 9/2004 |
| WO | WO2004105272 A1 | 12/2004 |
| WO | WO2004107638 A2 | 12/2004 |
| WO | WO2005029790 | 3/2005 |
| WO | 2005048629 A1 | 5/2005 |
| WO | WO2005062633 | 7/2005 |
| WO | WO-2005078966 A1 | 8/2005 |
| WO | WO2005084146 A2 | 9/2005 |
| WO | WO2005120183 A2 | 12/2005 |
| WO | WO2006002676 A1 | 1/2006 |
| WO | WO2006083131 A1 | 8/2006 |
| WO | WO2008113373 A1 | 9/2008 |
| WO | WO-2008131401 A1 | 10/2008 |

OTHER PUBLICATIONS

3GPP, "3rd Generation Partnership Project, Technical Specification Group Radio Access Network, E-UTRAN Mobility Evaluation and Enhancement,(Release 9)", 3GPP Draft, R1-090856 TP for TR for Mobility Studies, 3rd Generation Partnership Project (3GPP), Mobile Competence Centre, 650, Route Des Lucioles, F-06921 Sophia-Antipolis Cedex, France, no. Athens, Greece, Feb. 3, 2009, XP050318707.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9 ) , 3GPP Standard; 3GPP TS 36.300, 3rd Generation Partnership Project (3GPP), Mobile Competence Centre ; 650, Route Des Lucioles ; F-06921 Sophia-Antipolis Cedex ; France, No. V9.2.0, Jan. 7, 2010, pp. 1-178, XP050401821, [retrieved on Jan. 7, 2010].

"3rd Generation Partnership Project; Technical Specification Group Radio Access Network; Evolved Universal Terrestrial Radio Access (E-UTRA) Radio Resource Control (RRC); Protocol specification (Release 8)" 3GPP Standard; 3GPP TS 36.331, 3rd Generation Partnership Project (3GPP), Mobile Competence Centre; 650, Route Des Lucioles ; F-06921 Sophia-Antipolis Cedex; France, No. V8.2.0, May 1, 2008, pp. 1-151, XP050377645.

3rd Generation Partnership Project; Technical Specification Group Radio Access Network; Evolved Universal Terrestrial Radio Access (E-UTRA) Radio Resource Control (RRC); Protocol specification (Release 9), 3GPP Standard; 3GPP TS 36.331, 3rd Generation Partnership Project (3GPP), Mobile Competence Centre ; 650, Route Des Lucioles ; F-06921 Sophia-Antipolis Cedex ; France, No. V9.1.0, Jan. 7, 2010, pp. 1-221, XP050401822 [retrieved on Jan. 7, 2010].

Baker, F., IETF, "RSVP Management Information Base Using SMIv2," Network Working Group, Request for Comments: 2206, pp. 1-64 (Sep. 1997).

(56) References Cited

OTHER PUBLICATIONS

Berger, L., et al., "RSVP Extensions for IPSEC Data Flows," IETF, Network Working Group, Request for Comments: 2207, pp. 1-14 (Sep. 1997).
Berger, L., "RSVP Refresh Overhead Reduction Extensions," IETF Network Working Group, Request for Comments: 2961, pp. 1-32 (Apr. 2001).
Bos et al., "A Framework for End-to-End Perceived Quality of Service Negotiation", IETF Internal Draft, draft-bos-mmusic-sdpqos-framework-00.txt, Nov. 2001, pp. 1-22.
Braden, R., "Resource ReSerVation Protocol (RSVP)—Ver. 1, Message Processing Rules," IETF, Network Working Group, Request for Comments: 2209, pp. 1-24 (Sep. 1997).
Braden, R., "Resource ReSerVation Protocol (RSVP)—Ver. 1 Functional Specification". IETF, Network Working Group, Request for Comments: 2205, pp. 1-105 (Sep. 1997).
Camarillo, G., et al., "Integration of Resource Management and SIP," IETF Internet Draft, draft-ietf-sip-manyfolks-resource-04.ps, Feb. 25, 2002, pp. 1-18.
Campbell, Andrew T. et al., "IP Micro-Mobility Protocols", Mobile Computing and Communications Review (MC2R), vol. 4, No. 4, pp. 45-53, (Oct. 2001).
ETRI, "Source Specific Multicast (SSM) Explicit Multicast (Xcast)" pp. 1-27 (Jun. 28, 2001).
Ho, Michael. "Integration AAA with Mobile IPv4", Internet Draft, pp. 1-59, Apr. 2002.
Huawei, et al.,"Clarification of definitions of HO failure cases", RAN3, 3GPP Draft; 36300_CR0202_(REL-9)_R2-101906_R3-100635, 3rd Generation Partnership Project (3GPP), Mobile Competence Centre; 650, Route Des Lucioles; F-06921 Sophia-Antipolis Cedex ; France, vol. RAN WG2, no. San Francisco, USA; Feb. 22, 2010, Mar. 4, 2010, XP050422194 USA; Mar. 4, 2010, XP060422194, [retrieved on Mar. 4, 2010].
Ian F.A., et al., "Mobility Management in Next-Generation Wireless Systems", Proceedings of the IEEE, IEEE. New York, us, vol. 87, No. 8, Aug. 1, 1999, XP011044241, ISSN: 0018-9219.
Johnson, D., et al., IETF Mobile IP Working Group, "Mobility Support in IPv6,"; Feb. 26, 2003 Downloaded From http://www.join.uni-muenster.de on Dec. 29, 2004, pp. 1-169.
Karagiannis, Georgios. "Mobile IP: State of the Art Report," Ericsson, No. 3/0362-FCP NB 102 88 UEN, pp. 1-63, (Jul. 13, 1999).
Koodli, R. et al.: "Fast Handovers and Context Transfers in Mobile Networks" Computer Communication Review, ACM, New York, NY, US, vol. 31, No. 5, Oct. 1, 2001, pp. 37-47, XP001115324 ISSN: 0146-4833 abstract p. 2, right-hand column, last paragraph-p. 3, left-hand column, paragraph 3 p. 5, right-hand column, last paragraph-p. 7, right-hand column, last paragraph.
Leon-Garcia, Alberto; "Communication Networks: Fundamental Concepts and Key Architectures" McGraw-Hill; 2nd Edition; Copyright 2004, pp. 44-52, 429-431.
Li, Yalun et al. "Protocol Architecture for Universal Personal Computing," IEEE Journal on Selected Areas in Communications, IEEE Inc. New York, US, vol. 15, No. 8, Oct. 1, 1997, pp. 1467-1476, XP000721278 ISSN: 0733-8716.
Loughney, J. et al. "Context Transfer Protocol (CXTP)" IETF Standard, Request for Comments: 4067, Internet Engineering Task Force, IETF, CH, Jul. 2005, XP015041932 ISSN: 0000-0003 pp. 1 to 33.
Mankin, A., et al., "Resource ReSerVation Protocol (RSVP) Version 1, Applicability Statement: Some Guidelines on Deployment", IETF, Network Working Group, Request for Comments: 2208, pp. 1-6 (Sep. 1997).
Marshall, W. et al. "Integration of Resource Management and SIP: SIP Extensions for Resource Management," IETF Internet Draft, draft-ietf-sip-manyfolks-resource-02.txt, Aug. 2001, pp. 1-28.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.

Moy, J., "OSPF Version 2", Network Working Group, Request for Comments: 2328, pp. 1-244 (Apr. 1998).
Nortel: "Forward Hand-Off options", R2-071980, 3GPP TSG-RAN WG2 Meeting #58, Kobe, Japan, May 7-11, 2007, sections 2-3.
Pallini, G P. et al., "Trends in Handover Design" IEEE 34(3), pp. 82-90, Mar. 1, 1996, XP00557380.
Panasonic, "Necessity of forward handover", 3GPP Draft, R2-062146, 3rd Generation Partnership Project (3GPP), Mobile Competence Centre, 650, Route Des Lucioles, F-06921 Sophia-Antipolis Cedex, France, vol. RAN WG2, no. Tallinn, Aug. 23, 2006, XP050131764.
Papalilo, D. et al. "Extending SIP for QoS Support", www.coritel.it/publications/IP_download/papalilo-salsano-veltri.pdf, Dec. 8, 2001, pp. 1-6.
Perkins, C., "IP Mobility Support for IPv4", Nokia Research Center, Network Working Group, Request for Comments: 3220, Jan. 2002, downloaded from http://www.ietf.org on Dec. 29, 2004, pp. 1-92.
Perkins, C., "IP Mobility Support", IBM, Network Working Group, Request for Comments: 2002, pp. 1-79 (Oct. 1996).
Rosenberg J et al:RFAC 3261: "SIP: Session Initiation Protocol" Jun. 1, 2002, pp. 1-269, XP015009039.
Schulzrinne et al., "Application-Layer Mobility Using SIP", 0-7803-7133 IEEE, pp. 29-36, Jan. 2000.
Taiwan Search Report—TW097121439—TIPO—Nov. 28, 2011.
Takako Mita, et al., A Proposal for Seamless QoS Support in Mobile Networks, Research Report of Information Processing Society 2004-MBL-29, Japan, Information Processing Society of Japan, May 13, 2004, vol. 2004, No. 44, pp. 129 to 134.
Thulasi, A., et al., "IPv6 Prefix Delegation Using ICMPv6", Network Working Group, Hewlett-Packard, pp. 1-33, Apr. 2004.
TIA/EIA/IS-707A.8 "Data Service Options for Spread Spectrum Systems: Radio Link Protocol Type 2" pp. 1-1:4:12 (Mar. 1999).
Trossen, D. et al., "A Dynamic Protocol for Candidate Access-Router Discovery", pp. 1-36 Mar. 14, 2003.
Valko, A.G. et al.: "Cellular IP: A New Approach to Internet Host Mobility" Computer Communication Review, Association for Computing Machinery. New York, USvol.29, No. 1, Jan. 1999, pp. 50-65, XP000823873 ISSN: 0146-4833, p. 56, Line 7-Line13.
Wedlund et al: "Mobility Support Using SIP", Proc. of ACM/IEEE International Conference on Wireless and Mobile Multimedia (WoWMoM '99), Seattle, Washington, Aug. 1999.
Wroclawski, J., "The Use of RSVP with IETF Integrated Services," IETF, Network Working Group, Request for Comments: 2210, pp. 1-31 (Sep. 1997).
Zhou, S., et al., "A Location Management Scheme for Mobility Support in Wireless IP Networks Using Session Initiation Protocol (SIP)", 1531-2216/01 IEEE, pp. 486-491, Oct. 2001.
Zte, et al., "Handover Cause Report for Mobility Robustness Optimization", 3GPP Draft; R3-092982, 3rd Generation Partnership Project (3GPP), Mobile Competence Centre ; 650, Route Des Lucioles ; F-06921 Sophia-Antipolis Cedex ; France, no. Jeju; Nov. 9, 2009, XP050392455, [retrieved on Nov. 19, 2009].
3GPP TS 36.423, "3rd Generation Partnership Project; Technical Specification Group Radio Access Network; Evolved Universal Terrestrial Radio Access (E UTRA) and Evolved Universal Terrestrial Radio Access Network (EUTRAN); X2 Application Protocol (X2AP)", version 0.0.1, Release 8, year 2007, pp. 9.
Mockapetris P., "Domain Names—Implentation and Specification", IETF RFC 1035, Nov. 1987.
Basic Knowledge of Communications Term of Switching HUB, URL, http://www.wdic.org/w/WDIC/%E3%82%B9%E3%82%-A4%E3%83%83%E3%83%81%E3%83%B3%E3%82%B0HUB, Nov. 9, 2006.
Droms, R.: "Dynamic Host Configuration Protocol," IETF Standard, RFC 2131, Internet Engineering Task Force, IETF, CH, pp. 1-45, (Mar. 1997) XP015007915.
"Network Layer Protocol," Jul. 13, 2002, chap. 6, pp. 1-35, URL: http://www2.yamanashi-ken.ac.jp/~itoyo/lecture/network/network06/index06.htm.
"Terms for Use in Textbooks and Lectures on Distributed Computing," Feb. 13, 2005, URL: http://web.archive.org/web/20050213090736/http://www.nuis.ac.jp/~nagai/lecture/dce.html.

\* cited by examiner

EXAMPLE SOURCES THAT DETERMINE RADIO LINK FAILURE THRESHOLD

- ▶ QUALITY OF SERVICE ← 505
    - ▷ SUBSCRIBER AGREED SERVICE
        - ▷ GBR; ABR; MINBR
        - ▷ BLER; PER; BER
        - ▷ PDR
    - ▷ TRAFFIC PRIORITY
    - ▷ TIME-FREQUENCY RESOURCES GRANTED
- ▶ ACCESS TERMINAL ← 515
    - ▷ APPLICATION(S)
    - ▷ MODE(S) OF OPERATION
        - ▷ SISO; SIMO; SU-MIMO; MU-MIMO
    - ▷ EQUIPMENT CAPABILITIES
- ▶ NETWORK PLANNING ← 525

FIG. 5

FORWARD HANDOVER UNDER RADIO LINK FAILURE

CLAIM OF PRIORITY UNDER 35 U.S.C. §119

This Application for patent claims the benefit of U.S. Provisional Application Ser. No. 60/942,661 filed on Jun. 7, 2007, and entitled "A METHOD AND APPARATUS FOR FORWARD HANDOVER." The entirety of this application is expressly incorporated herein by reference.

BACKGROUND

I. Field

The subject specification relates generally to wireless communications and, more particularly, to handover mechanism(s) for handover of a mobile terminal in a wireless communication system.

II. Background

Conventional technologies utilized for transmitting information within a mobile communication network (e.g., a cellular telephone network) include frequency, time and code division based techniques. In general, with frequency division based techniques calls are split based on a frequency access method, wherein respective calls are placed on a separate frequency. With time division based techniques, respective calls are assigned a certain portion of time on a designated frequency. With code division based techniques respective calls are associated with unique codes and spread over available frequencies. Respective technologies can accommodate multiple accesses by one or more users.

More particularly, frequency division based techniques typically separate the spectrum into distinct channels by splitting it into uniform chunks of bandwidth, for example, division of the frequency band allocated for wireless cellular telephone communication can be split into 30 channels, each of which can carry a voice conversation or, with digital service, carry digital data. Each channel can be assigned to only one user at a time. One commonly utilized variant is an orthogonal frequency division technique that effectively partitions the overall system bandwidth into multiple orthogonal subbands. These subbands are also referred to as tones, carriers, subcarriers, bins, and frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time and code division techniques) includes one or more base stations that provide a coverage area and one or more mobile (e.g., wireless) terminals that can transmit and receive data within the coverage area. A typical base station can simultaneously transmit multiple data streams or flows for multicast or unicast services, and signaling. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can deteriorate due to radio link variations associated with interference inflicted by other terminals operating in a same or disparate coverage area, seasonal changes (e.g., weather fluctuation, time of day, . . . ), and so forth. Substantial degree of deterioration, or radio link failure, can lead to terminal handover to a disparate serving cell. Typically handover incurs a service disruption (e.g., a dropped call, a substantially slowed-down data transfer, and the like). There is therefore a need in the art for handover mechanism(s) that avoid service disruption without substantive overhead.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

The subject innovation provides system(s) and method(s) to implement forward handover under radio link failure. A configurable, unambiguous criterion for radio link failure (RLF) is established through a reference threshold for a channel quality metric. The threshold ($CQI_{TH}$) can be determined based at least in part on (a) quality of service (e.g., subscriber agreed service, traffic priority, time-frequency resources granted or available); (b) the capabilities of a served terminal (e.g., antenna configuration, multi-mode operation) that monitors radio link conditions, and the applications executed and mode of operation; or (c) network planning or configuration such as geographic deployment, frequency bands licensed for service, and so forth. A low-overhead (e.g., O(1 bit)) indication of RLF is conveyed as a NULL channel quality indicator when the channel quality metric is below the predetermined threshold. Onset of RLF triggers a timer for preparation of forward handover (FHO) during which service is retained and normal operation can resume if link quality recovers above $CQI_{TH}$. Forward handover is pursued once the timer expires. By controlling the magnitude of the time, latency associated with a handover procedure can be controlled. Preparation of FHO includes synchronization of a terminal that undergoes handover with a set of target cells, and exchange via a backhaul network backbone of operational information like system information, uplink conditions, buffered data, and context among a serving cell and the set of target cells.

In an aspect, the subject innovation discloses a method for facilitating handover in wireless system, the method comprising: establishing a radio link failure (RLF) criterion by configuring a threshold for a channel quality metric; receiving an indication of a radio link failure condition when the criterion is fulfilled; and preparing for handover.

In another aspect, a device that operates in a wireless environment is described, the device comprising: a processor configured to set a configurable threshold for a channel quality metric; to receive an indication of a radio link failure (RLF) condition when the channel quality metric is below the configurable threshold; to receive an indication of a radio link failure (RLF) condition when the channel quality metric is below threshold; and to prepare for handover under the RLF condition; and a memory coupled to the processor.

In yet another aspect, an apparatus that operates in a wireless environment is disclosed, the apparatus comprising: means for configuring a threshold for a channel quality metric; means for conveying the configured threshold for the channel quality metric, means for receiving an indication of a radio link failure (RLF) condition when the channel quality metric is below threshold; and means for preparing for handover under the RLF condition.

In a further yet aspect, the subject innovation discloses a computer program product comprising a computer-readable medium including: code for causing at least one computer to configure a threshold for a channel quality metric to determine a radio link failure (RLF) criterion; code for causing at least one computer to convey the configured threshold for the channel quality metric; code for causing at least one computer to receive an indication of a radio link failure condition when the channel quality metric is below threshold; and code for causing at least one computer to prepare for handover.

In an aspect, a method for forward handover under link failure in wireless system is disclosed, the method comprising: receiving a channel quality metric threshold, the threshold establishes a radio link failure criterion; conveying an indication of a RLF condition when the channel quality metric is below the threshold; preparing for forward handover; and pursuing forward handover.

In another aspect, an apparatus that operates in a wireless environment is described, the apparatus comprising: a processor configured to receive a channel quality metric threshold which determines a radio link failure criterion; to generate the channel quality metric; to convey a channel quality indicator (CQI) report that indicates a RLF condition when the channel quality metric is below the threshold; and to prepare for forward handover; and a memory coupled to the processor.

In yet another aspect, the subject innovation includes a wireless device comprising: means for receiving a radio link failure criterion, wherein the radio link failure criterion is determined by a threshold for a channel quality metric; means for conveying an indication of a RLF condition when the criterion is fulfilled; means for preparing for forward handover; and means for pursuing forward handover.

In a further aspect, the subject specification discloses a computer program product comprising a computer readable medium including: code for causing at least one computer to receive a channel quality metric threshold; code for causing at least one computer to convey an indication of a radio link failure condition when the channel quality metric is below the threshold; and code for causing at least one computer to pursue forward handover.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIGS. 3A and 3B are two diagrams that depict, respectively, an example service disruption cycle and an example service recovery upon a radio link failure condition sets on.

FIG. 5 is a diagram that illustrates example sources that determine radio link failure threshold.

DETAILED DESCRIPTION

Figure 1:
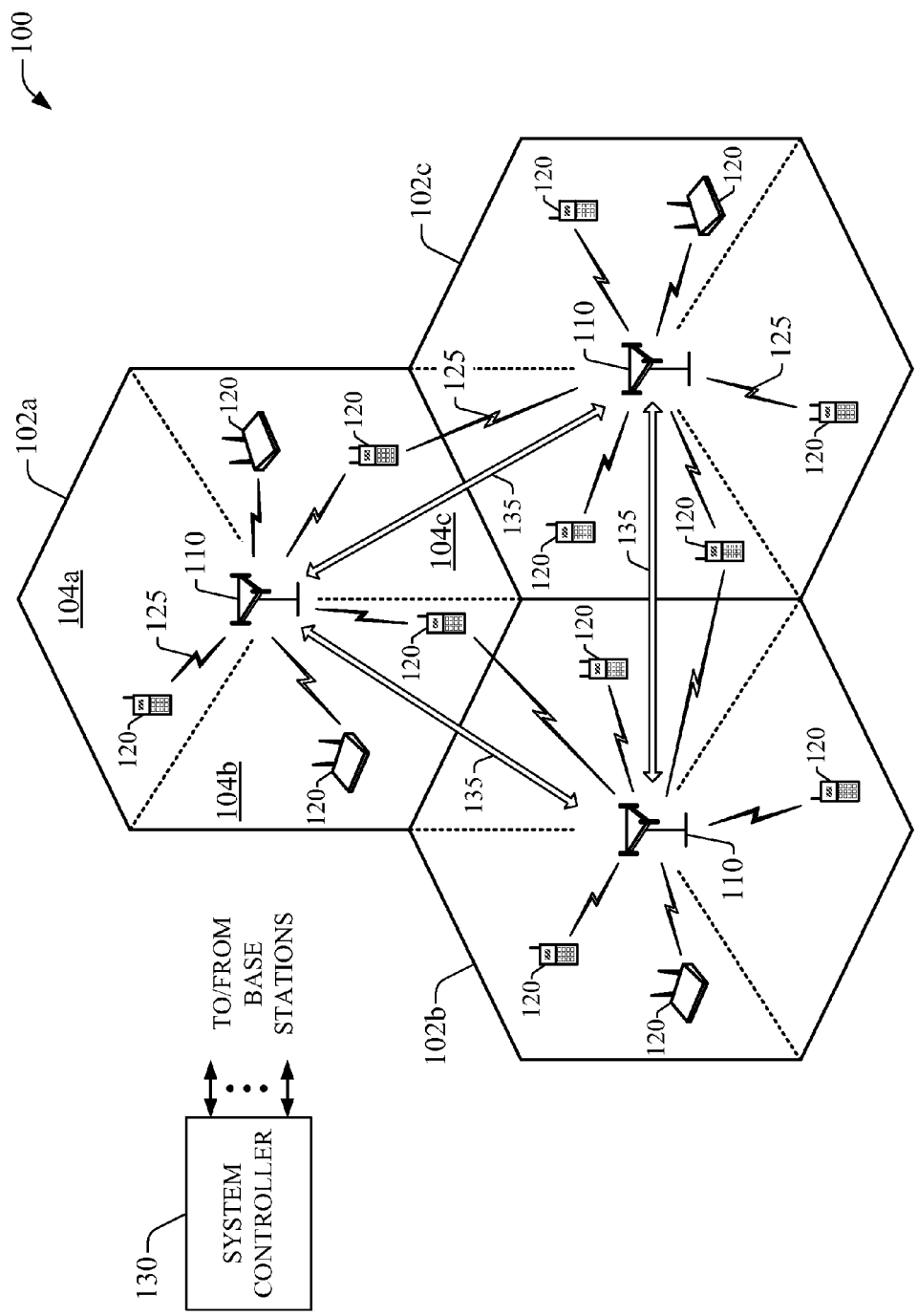
FIG. 1 illustrates an example wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processors a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, a mobile terminal, a mobile, a remote station, an access point, a remote terminal, an access terminal, a user terminal, a user device, a user equipment (UE), a cellular telephone, a personal communication service (PCS) telephone, a cordless telephone, a session initiation protocol (SIP) phone, a wireless local loop (WLL) station, a handheld device having wireless connection capability, or other processing device connected to a wireless modem, and the like.

Additionally, embodiments described in the subject specification related to a base station, which it may refer to a device in an access network that communicates over the air-interface, through one or more sectors, with wireless terminals, and with other base stations through wired or wireless backhaul network communication. The base station may act as a router between the wireless terminal and the rest of the access network, which may include an internet-protocol (IP) network, by converting received air-interface frames to IP packets. The base station can also coordinate management of attributes for the air interface through a scheduler which establishes communication priorities and resources. A base station may also be referred to as an access point, Node B, evolved Node B (eNodeB), home Node B, or some other terminology.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate through a radio link 125 with one or more of the terminals 120. By way of non-limiting example, a base station 110 can be an access point, an eNode B, or another appropriate network entity. Each base station 110 provides communication coverage for a particular geographic area 102a-c. It should be appreciated that while the coverage areas are illustrated as substantially the same hexagonal cells, size and shape of coverage cells need not be neither substantially the same nor identical; size and shape can be determined by various factors such as geography, landscape, operator(s) spectrum boundaries, population (e.g., rural, urban, etc.), and so forth. As utilized herein, the term "cell" can refer to a base station 110 and/or its coverage area 102a-c depending on the context in which the term is used.

To improve system capacity, the coverage area 102a, 102b, or 102c corresponding to a base station 110 can be partitioned into multiple smaller areas (e.g., areas 104a, 104b, and 104c), or sectors. Each of the smaller areas, or sectors, 104a, 104b, and 104c can be served by a respective base transceiver subsystem (BTS, not shown. As utilized herein, the term "sector" can refer to a BTS and/or its coverage area depending on the context in which the term is used. In addition, in one example, sectors 104a, 104b, 104c in a cell 102a, 102b, 102c can be formed and served in accordance to beamforming configurations generated by groups of antennas (e.g., smart antennas; not shown) operated by a base station 110, where each group of antennas is responsible for communication with terminals 120 in a portion of the cell 102a, 102b, or 102c. It should be appreciated that sector generation through beamforming can be dynamic, in accordance with operation needs and communication (e.g., radio link) conditions, reflected through channel quality indicator reports. For example, a base station 110 serving cell 102a can have a first antenna group corresponding to sector 104a, a second antenna group corresponding to sector 104b, and a third antenna group corresponding to sector 104c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. As further used herein, a "serving" access point is one with which a terminal has uplink traffic (data) transmissions, and a "target" (currently non-serving) access point is one with which a terminal may have downlink traffic and/or both downlink and uplink control transmissions but no uplink traffic. While the following description generally relates to a system in which each terminal communicates with one serving access point for simplicity, it should be appreciated that terminals can communicate with any number of serving access points.

In accordance with one aspect, terminals 120 can be dispersed throughout the system 100. Each terminal 120 can be stationary (e.g., a wireless router) or mobile (e.g., a cellular telephone). Mobile access terminals rely on handover mechanisms to switch from a serving access point to a disparate target cell to ensure mobility. In the subject innovation, mobility mechanism(s) can be triggered in accordance with radio link failure conditions configured by a network operator. By way of non-limiting example, a terminal 120 can refer to an access terminal (AT), a mobile station, user equipment, a subscriber station, a wireless device, a cellular telephone, a personal digital assistant (PDA), a wireless modem, a handheld device, and/or another appropriate device or network entity. Further, a terminal 120 can communicate with any number of base stations 110 or no base stations 110 at substantially any given moment.

In another example, the system 100 can utilize a centralized architecture by employing a system controller 130, or substantially any other network management component, that can be coupled to one or more base stations 110 and provide coordination and control for the base stations 110. In accordance with alternative aspects, system controller 130 can be a single network entity or a collection of network entities. Additionally, the system 100 can utilize a distributed architecture to allow the base stations 110 to communicate with each other as needed. Backhaul network backbone 135 can facilitate point-to-point communication between base stations employing such a distributed architecture. Backhaul link 135 can be a wire-based (e.g., T1/E1 lines or other links of the T-carrier/E-carrier protocol, digital subscriber lines) or fiber-optic-based. Communication over backhaul backbone 135 can be circuit-switched, packet-switched (e.g., based on internet protocol) or a combination thereof. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102, each sector 104, or a combination thereof.

In an example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes, polyphase sequences, Kasami codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Figure 2:
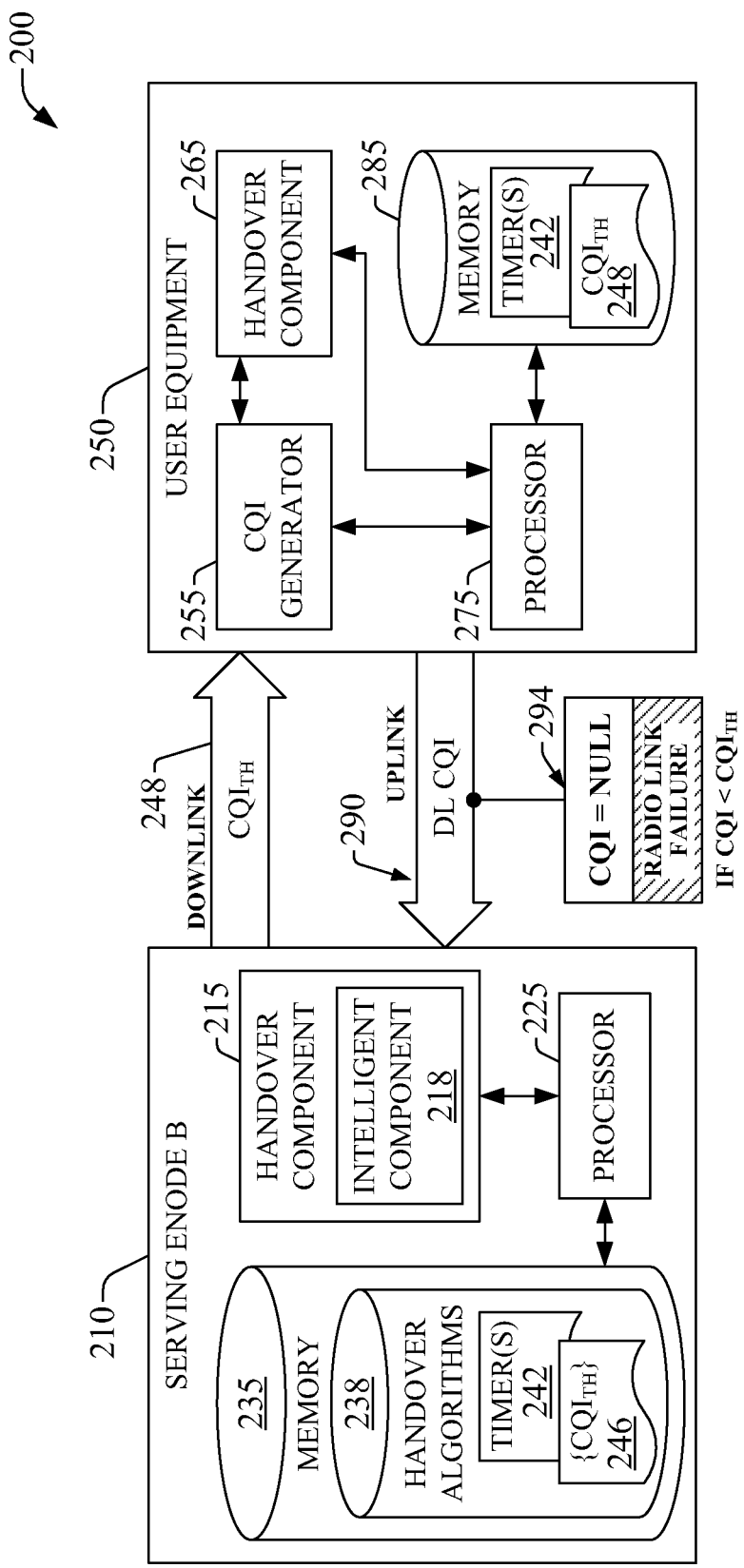
FIG. 2 is a block diagram of an example system that facilitates a determination of radio link failure and forward handover in accordance with aspects described in the subject specification.

FIG. 2 is a block diagram of an example system that facilitates a determination of radio link failure and forward handover in accordance with aspects described in the subject specification. In system 200, a serving eNode B 210 includes a handover component 215 that can facilitate handover to a target cell (not shown) once a radio link failure (RLF) condition has been identified. Handover component 215 can utilize processor 225 to execute handover algorithms 238 stored in memory 235. In an aspect, a RLF condition can be established by a network operator and stored within a set of handover algorithms 238. As an example, a RLF can be dictated by a set of channel quality metric thresholds $\{CQI_{TH}\}$ 246. The set of $\{CQI_{TH}\}$ 246 can be time-dependent (e.g., seasonal, time of day, adjusted in accordance to execution of an application, etc.) and/or based at least in part on the served user equipment 250, and specific performance metrics utilized to assess channel quality. Once a threshold channel quality indicator threshold $CQI_{TH}$ 248 is assigned to UE 250, it can be conveyed thereto through downlink. It should be appreciated that optimal magnitude of $CQI_{TH}$ arises from a tradeoff between mitigation of handover and retention of satisfactory link conditions to ensure satisfactory service. Intelligent component 218 can implement such an optimization.

Channel quality metrics that can be employed for establishing a radio link failure criterion based on channel quality threshold(s) $\{CQI\}$ 246 include: reference signal received power (RSRP) indicates signal strength ($E_S$) and reveals DL path loss, or attenuation, associated with attenuation of radiation conveyed in DL physical channels; reference signal strength indicator (RSSI), which typically conveys the effects of interference, indicating the strength of a signal relative to average background noise, e.g., carrier to interference ratio (C/I), or signal to noise ratio (SNR), the measured background noise can include intra-cell and inter-cell interference; reference signal over thermal noise (RSOT), typically conveyed as $E_S/N_0$. Derived metrics such as signal to noise and interference ratio (SINR) can also be employed to determine a performance metric threshold that establishes a radio link failure criterion. In addition, communication performance metrics like capacity or throughput can also be utilized to define a generalized radio link failure in a cell or sector.

An advantage of an unambiguously established RLF criterion based on channel quality and channel quality indicator reports is that service eNode B 210 receives DL CQI reports 290 periodically or aperiodically in accordance with CQI-report repetition factors, determined by CQI generator 255 for example, in substantially any technology utilized for wireless communication; thus, the RLF criterion can be regarded as universal. It should be noted that that such repetition factors for CQI=NULL 294 indication can be disparate from CQI-report repetition factors utilized by UE 250 within normal operation. Repetition factors can be adequately adjusted (typically upwards), e.g., via handover component 265, in order to ensure the integrity of RLF indication(s) since channel condition are in a failure condition. Another advantage is that multiple RLF criteria can be established through determination of disparate channel quality performance thresholds $CQI_{TH}$ on a per-terminal basis, a per-flow basis, a per-QoS basis, and so on. Further yet, an advantage of utilization of CQI=NULL 294 as an indication of RLF is that it is a lightweight, low-overhead (O(1 bit)) mechanism.

User equipment 250 can receive $CQI_{TH}$ 248 and store it in memory 285. In an aspect, as mentioned above, $CQI_{TH}$ 248 can be utilized to establish a RLF condition. In an aspect, CQI generator 255, via processor 275, can determine a channel quality metric typically based on a set of DL pilot sequences and convey a DL CQI 290 report to service eNode B 210. When DL channel quality metric is below $CQI_{TH}$ 248, a radio link failure condition arises, and UE 250 conveys a CQI=NULL 294 to indicate such RLF condition. Additionally, handover component 265 can initiate synchronization with disparate eNode Bs (e.g., target cells) in preparation for forward handover. Target cell search can proceed for a predetermined time interval which can be monitored by timer(s) 248 triggered by handover component 265 via processor 275 at the time a RLF condition has been indicated; in an aspect, the indication is conveyed by physical layer to upper layers in UE 250 (layer(s) not illustrated).

Additionally, an RLF indication (e.g., CQI=NULL 294) can trigger one or more RLF timer(s) 242; handover component 215 typically starts the RLF timer, which spans a time interval that is configurable by a network operator through handover component 215. Radio link failure timer(s) 242 can be configured to optimize mitigate jitter and latency during a communication session (e.g., voice or data transfer). Optimization can be effected through intelligent component 218.

Generally, DL channel conditions report(s) can be stored in memory 235 if necessary. Generation of broadband or narrowband downlink (DL) reference signals, which can be transmitted to user equipment 250 for generation of channel quality indications via CQI generator 255, can be implemented by handover component 215. Generation of DL channel conditions can effected periodically, the period for CQI reporting can be determined by traffic and load in a cell/sector covered by serving eNode B 210. In addition, the period for reporting can depend on reported DL channel conditions, in order to ensure accurate DL CQI 290 is received at serving eNode B 210. In addition, DL CQI 290 generation and reporting can be event triggered, e.g., an additional wireless device enters the coverage area of eNode B 210, an access terminal in a neighboring cell transmits a burst of data substantially increasing other sector interference, a data buffer size (e.g., residing in memory 285) increases and communication resources for UE 250, or a disparate UE, needs adjustment, and so on.

In an aspect, handover component 215 can rely upon an intelligent component 218 to autonomously identify (e.g., find, adapt, optimize) optimal values of $CQI_{TH}$ 246, RLF timer(s) 242, or repetition factors for DL CQI report(s) 290 based at least in part on quality of service, access terminal(s) served, frequency planning, cell/sector capacity, or throughput, and battery utility, and so forth. To that and other ends related to adaptation or optimization in other portions of the subject description associated with additional functionalities of the subject innovation, the term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithms, and reinforced learning—to a set of available data (information) on the system.

In particular, to the accomplishment of the various automated aspects described above and other automated aspects relevant to the subject innovation described herein, an intelligent component (not shown) can employ one of numerous methodologies for learning from data and then drawing inferences from the models so constructed, e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.

It is to be noted that processors 225 and 275 are configured to perform at least a portion of the functional actions, e.g., computations, necessary to implement the functionality of substantially any component in serving eNode B 210 and access terminal 250, respectively. Memories 235 and 285 can retain respective data structures, code instructions, algorithms, and the like, that can be employed by respective processors 216 and 236 when conferring base station 210 or UE 230 its functionality.

Figure 3A:
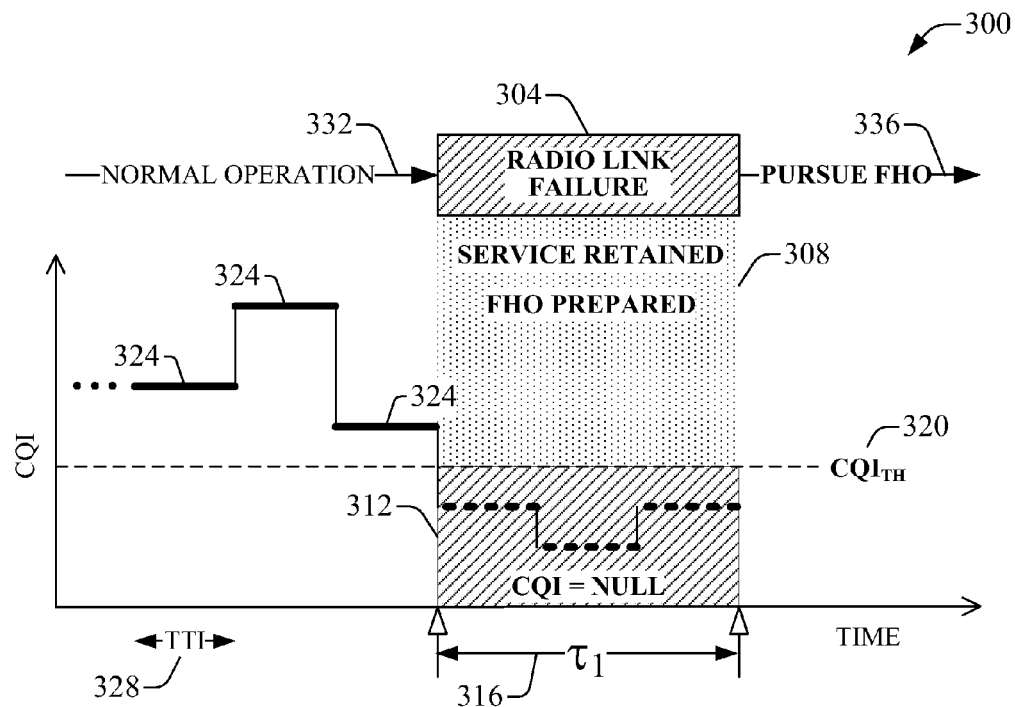
Figure 3B:
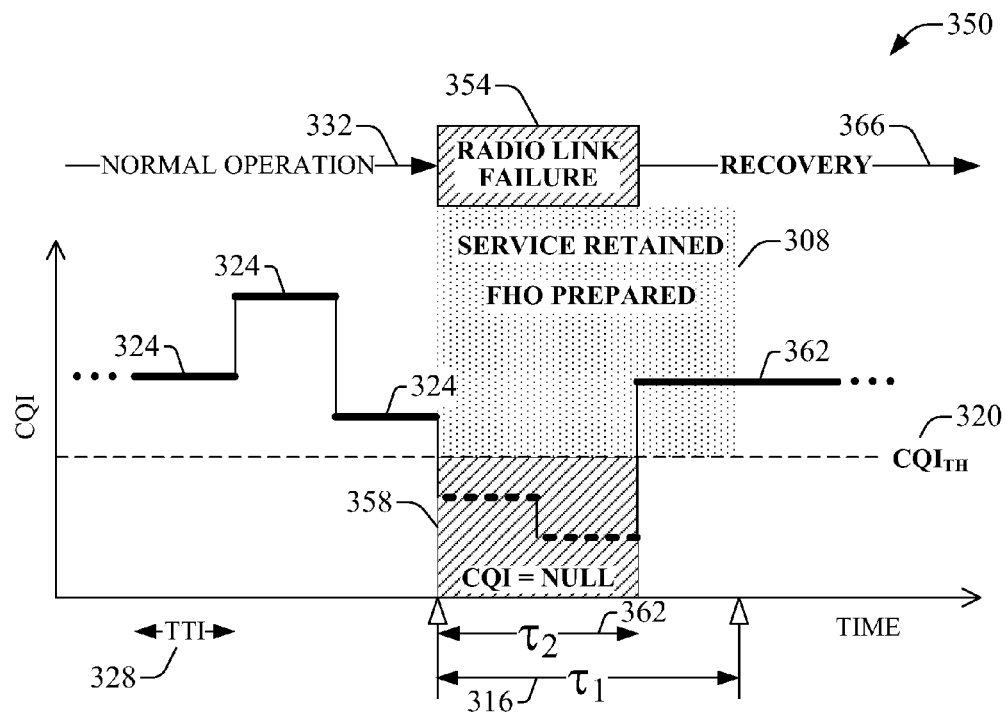

FIGS. 3A and 3B are two diagrams that depict, respectively, an example service disruption cycle (diagram 300) and an example service recovery (diagram 350) upon a radio link failure condition sets on. Service disruption. FIG. 3A presents an example time-dependent profile of a channel quality indicator CQI (e.g., SNR, SINR, C/I, inter-cell interference, intra-cell interference, . . . ) conveyed in reporting intervals $\Delta t$ 328 (e.g., a set of transmission time intervals, or a set of sub-transmission time intervals): typically $\Delta t$ 328 is dictated by the time-response of electronics associated with measurement components utilized to measure and process performance metric(s), e.g., RSOT, RSRP, etc., utilized to determine a CQI. It should be appreciated that $\Delta t$ 328 can vary from reporting period to reporting period. In diagram 300, after reported values of CQI 324 during normal operation 332, a radio link failure condition 304 is attained and a CQI=NULL 312 indication is conveyed as a result of determined (e.g., estimated) CQI values below $CQI_{TH}$ 320. In example diagram 300, RLF condition remains for a time interval $\tau_1$ 316, after which forward handover (FHO) can be pursued 336. As sketched in block 308, it is to be noted that throughout time interval $\tau_1$ 316, telecommunication service is retained—even though new traffic can be prevented from being scheduled—and forward handover can be prepared; e.g., an access terminal can pre-synchronize to, or conduct a coarse synchronization with, target eNode Bs. It is noted that time-region 308 in which FHO is prepared can span a time interval longer than $\tau_1$ 316, with advanced preparation triggered in accordance to a threshold, different from $CQI_{TH}$ 320, configured by a serving eNode B (e.g., eNode B 210) for UE measurements Service can be disrupted once FHO is pursued, and can typically be recovered once a mobile that pursues FHO attaches to a suitable target cell. It should be appreciated that timer $\tau_1$ 316 can be configured on a per-terminal basis, per-sector basis, per-QoS basis, per-application basis, etc., and can be set to zero. Adjustment of the magnitude of time $\tau_1$ can facilitate control of the latency associated with a handover procedure.

Service recovery. As in diagram 300, FIG. 3B presents an example time-dependent profile of CQI conveyed in reporting intervals $\Delta t$ 328. In diagram 350, radio link failure 354 onset is indicated by CQI=NULL 358, a conditions that spans a time interval $\tau_2$ 362 after which radio link condition improves and normal operation resumes (e.g., recovery 366) as reflected by CQI above $CQI_{TH}$ 320. It is to be noted that in a recovery 366 scenario, RLF time interval $\tau_2$ 362 is shorter than configured time $\tau_1$ 316—an upper bound timer in which service is retained and FHO can be prepared. In an aspect, recovery can entail newly scheduled packets, introduction of new radio bearers, etc. In view of possible operational scenarios in which service recovery occurs within time interval $\tau_2$ 362, it should be appreciated that timer $\tau_1$ 316 mitigates excessive FHO pursuits and ensuing target cell attachments. Such mitigation results in a reduction of operational complexity through a reduction of unwarranted (in view of possible service recovery) hops to target cells.

Figure 4A:
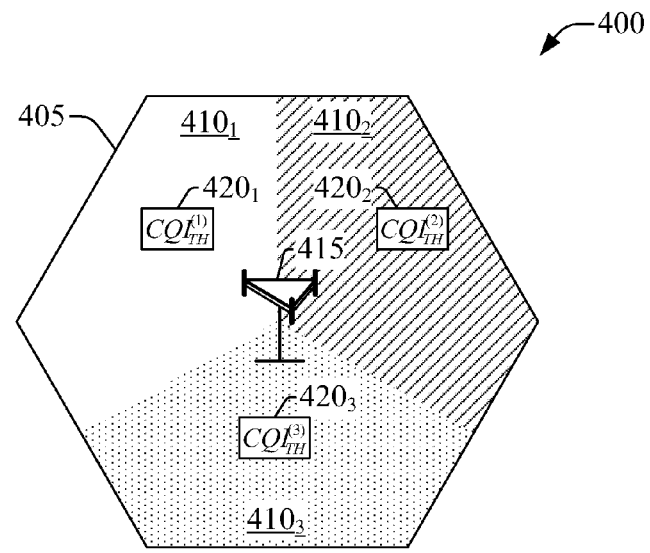
FIGS. 4A and 4B illustrate two scenarios to determine a magnitude of a threshold $CQI_{TH}$ that can be exploited to establish radio link failure based on channel performance metrics.
Figure 4B:
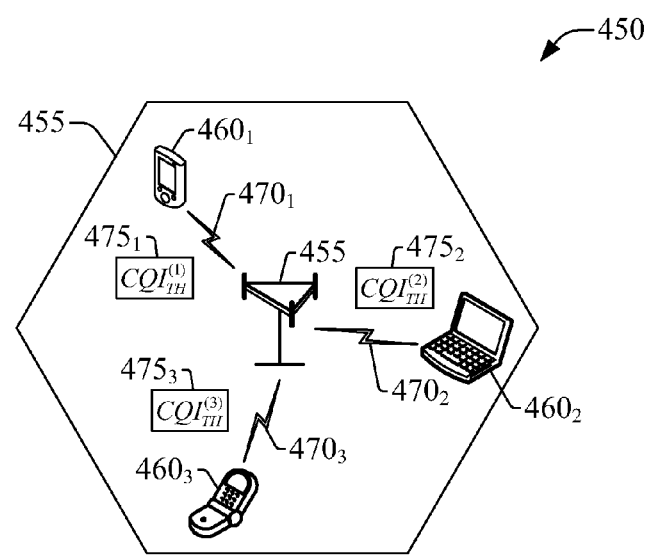

FIGS. 4A and 4B illustrate two scenarios to determine a magnitude of threshold $CQI_{TH}$ to establish radio link failure based on channel performance metrics.

FIG. 4A is a diagram that illustrates spatial diversity of $CQI_{TH}$. In diagram 400, a service cell 405 is divided in three sectors $410_1$-$410_3$, served by base station 415, each sector can be assigned a $CQI_{TH}$: $CQI_{TH}^{(\lambda)}$ $420_\lambda$ with $\lambda=1, 2, 3$. Having spatial CQI threshold diversity provides at least the advantage of customization of threshold conditions according to specific characteristics of each sector. For example, sector 4101 can be a heavily populated are of a downtown and thus a mobile station can be submitted to substantial intra-sector interference, therefore a low $CQI_{TH}^{(1)}$ can be adequate to mitigate likely hopping of terminals into neighboring cell(s)/sector(s) as a result of likely poor radio conditions. In addition, sector 410₂ can be a less populated area with generally high channel signal strength, thus an elevated $CQI_{TH}^{(2)}$ can be appropriate in order to ensure mobility and mitigate high load levels of the sector. Furthermore, sector 4103 can correspond to a region with a substantial number of roads and high vehicular traffic, in such scenario a low value of $CQI_{TH}^{(3)}$ can be appropriate since mobility is highly driven by the operation conditions (highly mobile terminals) and it may be desirable to mitigate handoff mobility associated with radio link failure. It should be appreciated that sectorizations are possible, with cells generally split into M sectors (M a positive integer) with M dependent on service cell.

FIG. 4B illustrates terminal diversity, or per-terminal configuration, of $CQI_{TH}$. In example diagram 450, coverage cell 455 serves mobile stations 4601-4603 through, respectively, radio links $470_1$-$470_3$. Radio link failure conditions of such links can be established through respective channel performance metric thresholds: $CQI_{TH}^{(\kappa)}$ 475$_\kappa$ with $\kappa=1, 2, 3$. Each radio link failure threshold can be adjusted in accordance with user equipment capabilities—e.g., multi-mode operation, DL/UL maximum data rates, antenna configuration, video- and music-streaming capabilities, packet-switched operation—in order to optimize terminal performance.

FIG. 5 is a diagram 500 that illustrates example sources that determine radio link failure threshold. The sources comprise three groups which can facilitate determination of $CQI_{TH}$: (i) Quality of service 505. This group includes subscriber agreed service, traffic priority, and time-frequency resources granted. Subscriber agreed service can comprise guaranteed bit rate (GBR), average bit rate (ABR), and minimum bit rate (MINBR); block error rate (BLER), packet error rate (PER), bit error rate (BER); and peak data rate (PDR). Disparate subscribers can have access to disparate rate levels; for instance, enterprise subscribers can have access to hard QoS that ensures a specific GBR rather than a MINBR. Subscriber agreed quality of service can be determined on a per-flow basis, wherein disparate applications executed by a subscriber are serviced within different agreed rates. Granted time-frequency resources characterize a radio link; $CQI_{TH}$ can be configured in accordance with operational system bandwidth, allocated subcarriers and/or resource blocks, allocated power, and so forth. In order to ensure agreed level of service, $CQI_{TH}$ can be determined on a per subscriber-basis, or a per-flow basis.

(ii) Access terminal. Disparate application(s) executed in a mobile station can have disparate $CQI_{TH}$ to ensure satisfactory execution and subscriber experience. In an aspect, radio link failure threshold (e.g., $CQI_{TH}$) can be configured in accordance with whether radio link resilience, or integrity, is critical to the application. For instance, voice communication, ecommerce, or wireless banking can depend critically on radio link failure, whereas application such as web browsing, or file transfer can tolerate substantive radio link failure without significant execution degradation. Additionally, disparate mobile stations can operate within different communication modes like single input-single output (SISO), single input-multiple output (SIMO), and single-user (SU) multiple-input-multiple output (MIMO) and multiple-user (MU) MIMO. Such modes of operation, and their afforded capacity, depend to substantially different extents on access to channel state information (e.g., DL CQI 290) at a served terminal. Consequently, a radio link failure threshold can be configured for each scheduled mode of operation of a terminal so as to ensure availability of channel quality indicators. Furthermore, user equipment generally possesses a specific set of technical capabilities like number of antennas, multi-mode (e.g., multiple system bandwidth operation; multiple telecommunication technology such as WCDMA, HSDPA; or telecommunication services like GPS) or single-mode chipsets, battery resources (e.g., long discharge characteristic time, solar-power assisted, . . . ), and so on, which can result in substantially different operation performance based at least in part on radio link threshold. For example, a multi-mode terminal that can operate with a substantive $CQI_{TH}$ since it can synchronize to target eNode Bs serving disparate bandwidths and frequency bands.

(iii) Network planning. Radio link failure threshold (e.g., $CQI_{TH}$) can be configured in accordance with available (e.g., licensed) frequency bands and bandwidth for operation, and geographic deployment characteristics (e.g., urban, metropolitan, rural). It is to be noted that in LTE, bandwidth typically determines the number of frequency subcarriers available for communication.

Figure 6:
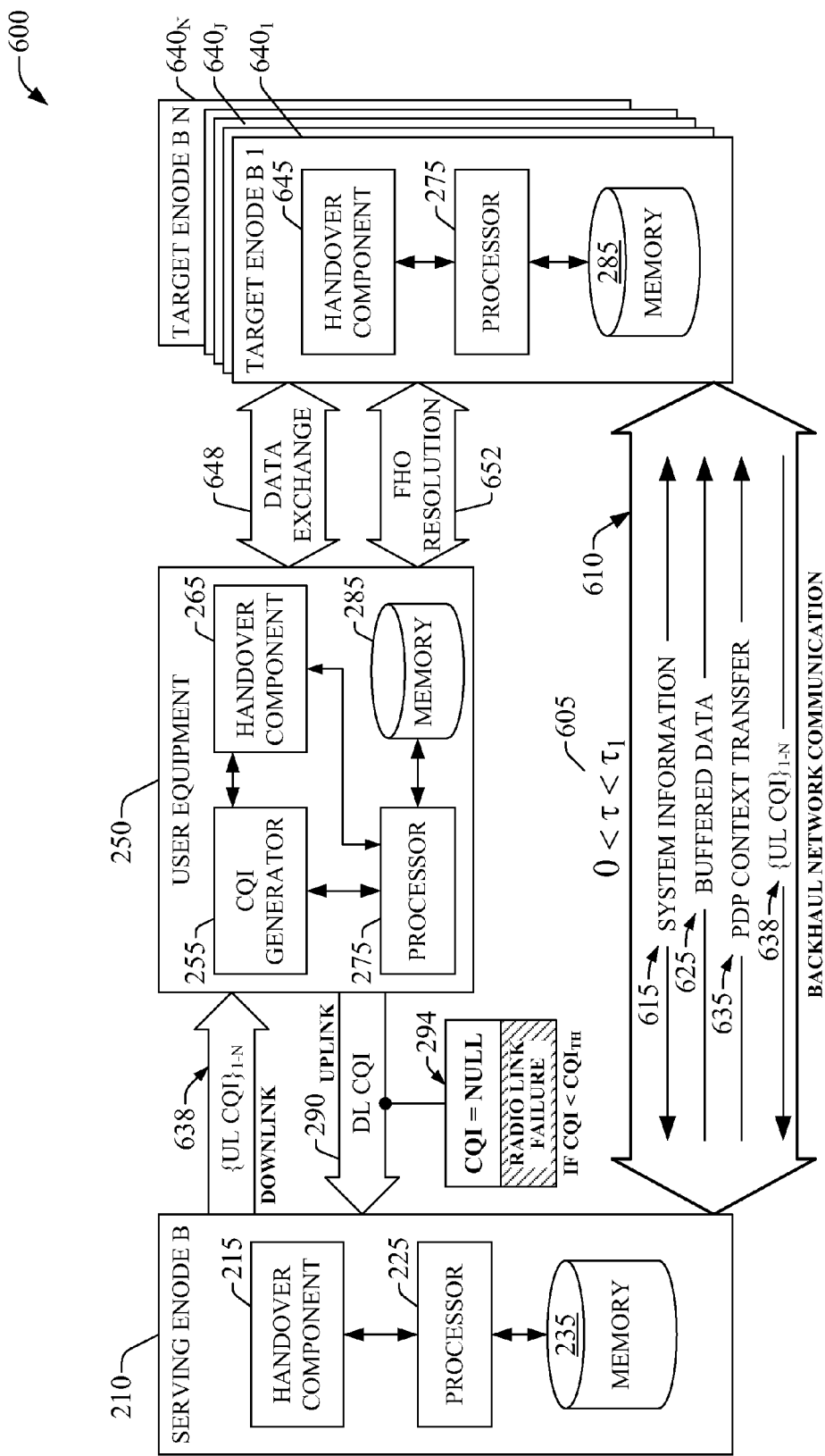
FIG. 6 is a block diagram of an example system that facilitates handover under radio link failure in accordance with aspects disclosed herein.

FIG. 6 is a block diagram of an example system 600 that facilitates handover under radio link failure. Components of system 600 possess substantially the same functionality as in system 200. Serving eNode B 210 and can receive an indication of radio link failure, e.g., CQI=NULL 294, when channel quality metric(s) lead to a channel quality indicator below a threshold $CQI_{TH}$ 248 (not shown in FIG. 6). Reports are generated by served user equipment 250 through a CQI generator 255, as discussed above. It should be appreciated that as the indication of radio link failure condition(s) can trigger handoff of user equipment 250, reports of downlink channel performance metrics DL CQI 290 are sufficient, as opposed to generation of both UL and DL CQI.

In an aspect, when a RLF condition indication (e.g., CQI=NULL 294) is received over the air-interface, serving eNode B 210 can trigger a RLF timer, which can span a time interval $\tau_1$ 605, during which serving eNode B 210 can prepare a set of target cells $640_1$-$640_N$ (N a positive integer) for handover. In another aspect, preparation for handover can be initiated in advance to a RLF condition, advanced preparation can be triggered in accordance to a threshold $A_{TH}$ for measurements performed, and conveyed to serving Node B 210, by user equipment 250. Threshold for advanced preparation $A_{TH}$ is different from $CQI_{TH}$, even though it can be related thereto. It should be appreciated that $A_{TH}$ can also be a part of the set of thresholds 246 stored in memory 235 (FIG. 1). It is noted that substantially the same sources, as described hereinbefore, that can be exploited to determine RLF threshold, e.g., $CQI_{TH}$, can be utilized in substantially the same manner to determine a set of thresholds $\{A_{TH}\}$ for advanced handover preparation. Preparation can be supported through communication over backhaul network backbone 610, such communication benefits from being substantially insensitive to communication channel conditions, as the communication is point-to-point among base stations (e.g., 210 and 640$_J$). Information exchanged among serving eNode B 210 and target eNode Bs 640$_1$-640$_N$ in preparation for handover can include (i) system information 615, which can comprise location information (e.g., location area, routing area), cell identity, pilot sequences (e.g., root indices for Zadoff-Chu codes) utilized for synchronization, system bandwidth which in LTE, for example, can include multiple values ranging from 1.25 MH to 20 MHz; pilot sequences employed in DL and UL reference signals; system frame number; CQI channel directives that determine repetition factors of CQI reports and frequency, or periodicity, of determination of channel quality indications; cell DL timing, in particular in asynchronous systems; and UL timing offset with respect to DL communications, physical random access channel (PRACH) configuration (e.g., preamble size, or preamble content), or management frame(s) configuration; symbol and cyclic prefix timing; allocated power or power density, and so forth; (ii) buffered data 625, which can be scheduled or unscheduled traffic as an aspect of preparation for handover can include a cessation of data scheduling; and (iii) packet data protocol (PDP) context transfer 635 which can include logical and transport channels utilized by user equipment 250, operating radio bearers, radio resources control signaling, and so on; (iv) a set of UL channel condition metrics $\{UL\ CQI\}_{1-N}$ 638 between user equipment 250 and target cells 640$_1$-640$_N$, which can then be conveyed by serving eNode 210 to UE 250 to facilitate handover resolution, such metrics can be received by base station 210 periodically, or due to triggering events in a target cell, e.g., a specific cell/sector load level is reached, a specific intra-cell or inter-cell interference level is detected, new system information is scheduled, and so forth.

It should be appreciated that target cells are typically neighboring cells, wherein whether a cell/sector is a neighbor can be determined not only on spatial consideration but also on signal-strength consideration based on UL measurements conducted at target cells; for instance, such measurements can be triggered by handover component 265 when a RLF indication is generated by CQI generator 255.

To effect handover, handover component 265 can utilize received information associated with target cells 640$_1$-640$_N$ to select a target eNode B, e.g., 640$_J$, and pursue a forward handover (FHO) resolution 652 which generally comprise signaling, e.g., FHO request, FHO request acknowledge, and UL/DL resource grant(s), among the selected target cell and UE 250. Once FHO is resolved, data exchange 648 can take place, wherein the data includes buffered data 625 received over backhaul network link 610, X2 interface in LTE, in preparation for FHO. It should be noted that once FHO is resolved, synchronization among UE 250 and the target cell can be performed and system information associated with the target cell can be read. Handover algorithm(s) employed by UE 250, through handover component 265 and processor 275, to resolve forward handoff can reside in memory 285.

Figure 7:
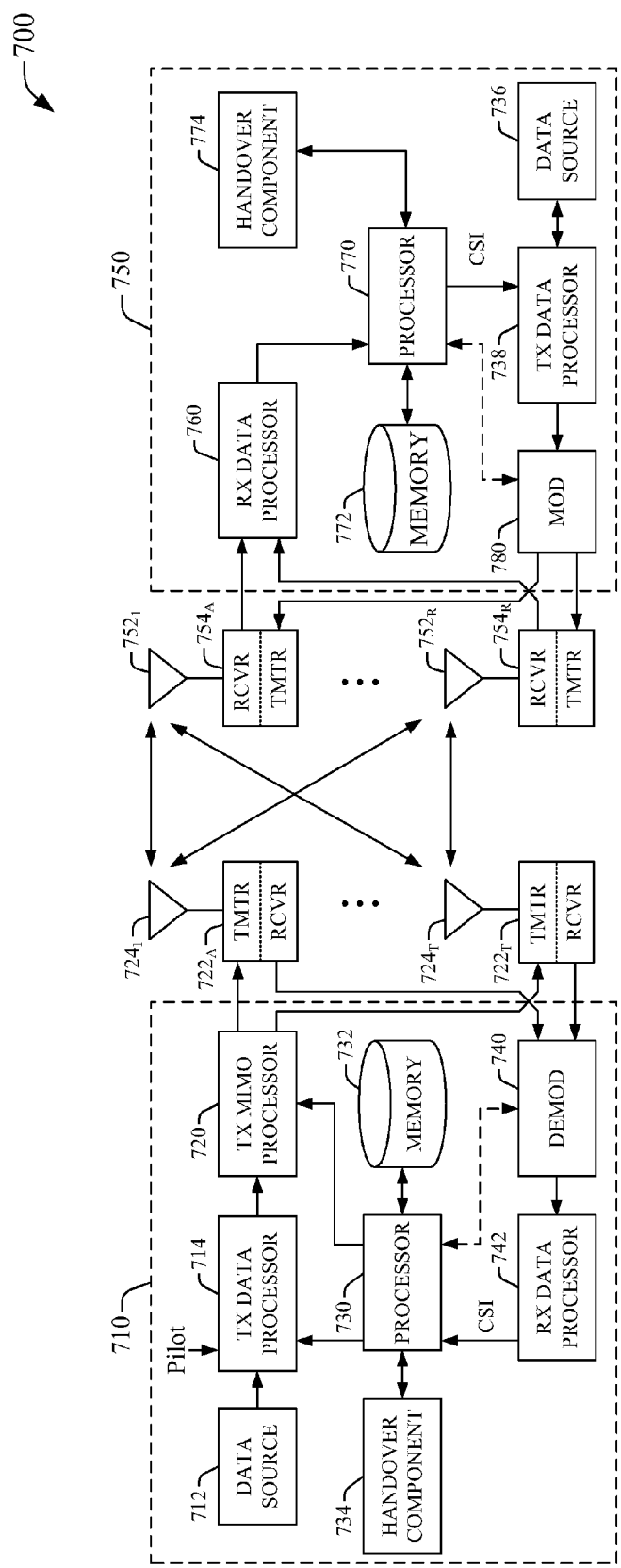
FIG. 7 is a block diagram of an example embodiment of a transmitter system and a receiver system in MIMO operation that can exploit aspects described in the subject specification.

FIG. 7 is a block diagram 700 of an embodiment of a transmitter system 710 (such as eNode B 210) and a receiver system 750 (e.g. user equipment 250) in a multiple-input multiple-output (MIMO) system that can provide for cell (or sector) communication in a wireless environment in accordance with one or more aspects set forth herein. At the transmitter system 710, traffic data for a number of data streams can be provided from a data source 712 to transmit (TX) data processor 714. In an embodiment, each data stream is transmitted over a respective transmit antenna. TX data processor 714 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK), or M-ary quadrature amplitude modulation (M-QAM), with M a positive integer) selected for that data stream to provide modulation symbols. The data rate, coding, and modulation for each data stream may be determined by instructions executed by processor 730, the instructions as well as the data can be stored in memory 732. Handover component 734 can execute, via processor 734, handover algorithms which can include determination of a radio link failure criterion, management of timers associated with RLF, or implementation of traffic scheduling changes (wherein a scheduler can reside within processor 770, for example) and exchange of system information with target cells in preparation for handover. Handover algorithms can be stored in memory 732.

The modulation symbols for all data streams are then provided to a TX MIMO processor 720, which may further process the modulation symbols (e.g., OFDM). TX MIMO processor 720 then provides $N_T$ modulation symbol streams to $N_T$ transceivers (TMTR/RCVR) 722$_A$ through 722$_T$. In certain embodiments, TX MIMO processor 720 applies beamforming weights (or precoding) to the symbols of the data streams and to the antenna from which the symbol is being transmitted. Each transceiver 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 722$_A$ through 722$_T$ are then transmitted from $N_T$ antennas 724$_1$ through 724$_T$, respectively. At receiver system 750, the transmitted modulated signals are received by $N_R$ antennas 752$_1$ through 752$_R$ and the received signal from each antenna 752 is provided to a respective transceiver (RCVR/TMTR) 754$_A$ through 754$_R$. Each transceiver 754$_1$-754$_R$ conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ transceivers 754$_1$-754$_R$ based on a particular receiver processing technique to provide $N_T$ "detected" symbol streams. The RX data processor 760 then demodulates, deinterleaves, and decodes each detected symbol stream to recover the traffic data for the data stream. The processing by RX data processor 760 is complementary to that performed by TX MIMO processor 720 and TX data processor 714 at transmitter system 710. A processor 770 periodically determines which pre-coding matrix to use, such a matrix can be stored in memory 772. Processor 770 is configured to formulate uplink message(s) comprising a matrix index portion and a rank value portion. Memory 772 may store instructions that when executed by processor 770 result in formulation of the uplink message(s). Uplink messages(s) can comprise various types of information regarding the communication link or received data stream(s)/flow(s), or a combination thereof. In particular, such information can comprise channel quality indicator report(s) (e.g., DL CQI 290). Handover component 734 can operate, at least partially, through processor 770. In particular, handover component 774 can generate an indication of radio link failure (e.g., CQI=NULL 358) through link (or channel) estimation and comparison with a RLF link failure criterion based on channel quality. Additionally, handover component 774 can execute, at least in part via processor 770, handover algorithms which can be stored in memory 772. The uplink message(s) is then processed by a TX data processor 738, which also receives traffic data for a number of data streams from a data source 736, modulated by a modulator 780, conditioned by transceiver 754$_A$ through 754$_R$, and transmitted back to transmitter system 710.

At transmitter system 710, the modulated signals from receiver system 750 are received by antennas 724$_1$-724$_T$, conditioned by transceivers 722$_A$-722$_T$, demodulated by a demodulator 740, and processed by a RX data processor 742 to extract the reserve link message transmitted by the receiver system 750. Processor 730 then determines which pre-coding matrix to use for determining the beamforming weights and processes the extracted message.

A mobile station 230 can be scheduled to operate in SIMO, SU-MIMO, and MU-MIMO, depending at least in part on the channel quality indicators reported by said receiver. Next, communication in these modes of operation is described. It is noted that in SIMO mode a single antenna at the receiver ($N_R$=1) is employed for communication; therefore, SIMO operation can be interpreted as a special case of SU-MIMO. Single-user MIMO mode of operation corresponds to the case in which a single receiver system 750 communicates with transmitter system 710, as previously illustrated FIG. 7 and according to the operation described in connection therewith. In such a system, the $N_T$-transmitters 724$_1$-724$_T$ (also known as TX antennas) and $N_R$ receivers 752$_1$-752$_R$ (also known as RX antennas) form a MIMO matrix channel (e.g., Rayleigh channel, or Gaussian channel, with slow or fast fading) for wireless communication. As mentioned above, the SU-MIMO channel is described by a $N_R \times N_T$ matrix of random complex numbers. The rank of the channel equals the algebraic rank of the $N_R \times N_T$ matrix, which in terms of space-time, or space-frequency coding, the rank equals the number $N_V \leq \min\{N_T, N_R\}$ of independent data streams (or layers) that can be sent over the SU-MIMO channel without inflicting inter-stream interference.

In one aspect, in SU-MIMO mode, transmitted/received symbols with OFDM, at tone ω, can be modeled by:

$$y(\omega) = \underline{H}(\omega)c(\omega) + n(\omega). \tag{1}$$

Here, $y(\omega)$ is the received data stream and is a $N_R \times 1$ vector, $\underline{H}(\omega)$ is the channel response $N_R \times N_T$ matrix at tone ω (e.g., the Fourier transform of the time-dependent channel response matrix $\underline{h}$), $c(\omega)$ is an $N_T \times 1$ output symbol vector, and $n(\omega)$ is an $N_R \times 1$ noise vector (e.g., additive white Gaussian noise). Precoding can convert a $N_V \times 1$ layer vector to $N_T \times 1$ precoding output vector. $N_V$ is the actual number of data streams (layers) transmitted by transmitter 710, and $N_V$ can be scheduled at the discretion of the transmitter (e.g., transmitter 710, eNode B 210, or access point 110) based at least in part on channel conditions (e.g., reported CQI, like DL CQI 290, according to a reporting approach established by a serving access point) and the rank reported in a scheduling request by a terminal (e.g., receiver 750). It should be appreciated that $c(\omega)$ is the result of at least one multiplexing scheme, and at least one precoding (or beamforming) scheme applied by the transmitter. Additionally, $c(\omega)$ can be convoluted with a power gain matrix, which determines the amount of power transmitter 710 allocates to transmit each data stream $N_V$. It should be appreciated that such a power gain matrix can be a resource that is assigned to a terminal (e.g., access terminal 230, receiver 750, or UE 230) through a scheduler in the serving node in response, at least in part, to a reported CQI.

Figure 8:
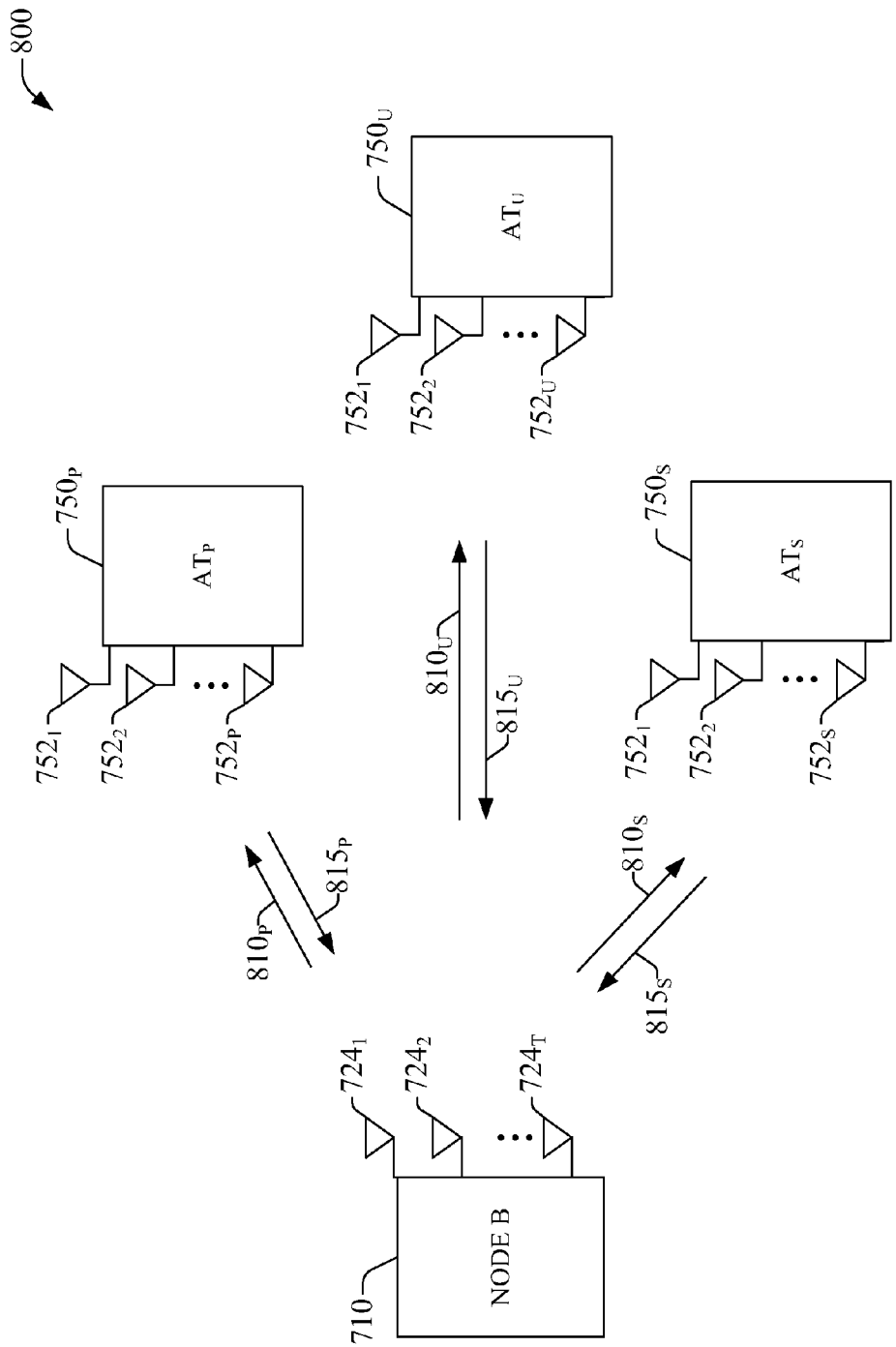
FIG. 8 is a block diagram of an example multiple-user MIMO system.

As mentioned above, according to an aspect, MU-MIMO operation of a set of terminals is within the scope of the subject innovation. Moreover, scheduled MU-MIMO terminals operate jointly with SU-MIMO terminals and SIMO terminals. FIG. 8 illustrates an example multiple-user MIMO system 800 in which three ATs 850$_P$, 850$_U$, and 850$_S$, embodied in receivers substantially the same as receiver 850, communicate with transmitter 810, which embodies a Node B. It should be appreciated that operation of system 800 is representative of operation of substantially any group of wireless devices scheduled in MU-MIMO operation within a service cell by a centralized scheduler residing in a serving access point. As mentioned above, transmitter 710 has $N_T$ TX antennas 724$_1$-724$_T$, and each of the ATs has multiple RX antennas; namely, AT$_P$ has $N_P$ antennas 752$_1$-752$_P$, AP$_U$ has $N_U$ antennas 752$_1$-752$_U$, and AP$_S$ has $N_S$ antennas 752'-752S. Communication between terminals and the access point is effected through uplinks 815$_P$, 815$_U$, and 815$_S$. Similarly, downlinks 810$_P$, 810$_U$, and 810$_S$ facilitate communication between Node B 710 and terminals AT$_P$, AT$_U$, and AT$_S$, respectively. Additionally, communication between each terminal and base station is implemented in substantially the same manner, through substantially the same components, as illustrated in FIG. 7 and discussed in the description thereof.

Terminals can be located in substantially different locations (see FIG. 1) within the cell serviced by access point 710, therefore each user equipment 750$_P$, 650$_U$, and 650$_S$ has its own MIMO matrix channel $\underline{h}_\alpha$ and response matrix $H_\alpha$ (α=P, U, and S), with its own rank (or, equivalently, singular value decomposition), and its own associated channel quality indicator. Due to the plurality of users present in the cell serviced by the base station 710, intra-cell interference can be present and can affect CQI values reported by each of terminals 750$_P$, 750$_U$, and 750$_S$.

Although illustrated with three terminals in FIG. 8, it should be appreciated that a MU-MIMO system can comprise substantially any number of terminals; each of such terminals indicated below with an index k. In accordance with various aspects, each of the access terminals 750$_P$, 750$_U$, and 750$_S$ can report CQI to Node B 710. Such terminals can report CQI from one or more antennas, utilizing a cyclic or parallel reporting approach. The frequency and the spectral characteristics, e.g., which subbands, of such reporting can be dictated by serving Node B 710. In addition, Node B 710 can dynamically re-schedule each of terminals 750$_P$, 750$_U$, and 750$_S$ in a disparate mode of operation, like SU-MIMO or SISO, and establish a disparate CQI reporting directive(s) for each of the terminals.

In one aspect, transmitted/received symbols with OFDM, at tone ω and for user k, can be modeled by:

$$y_k(\omega) = \underline{H}_k(\omega)c_k(\omega) + \underline{H}_k(\omega)\Sigma' c_m(\omega) + n_k(\omega). \tag{2}$$

Here, symbols have the same meaning as in Eq. (1). It should be appreciated that due to multi-user diversity, other-user interference in the signal received by user k is modeled with the second term in the left-hand side of Eq. (2). The prime (') symbol indicates that transmitted symbol vector $c_k$ is excluded from the summation. The terms in the series represent reception by user k (through its channel response $\underline{H}_k$) of symbols transmitted by a transmitter (e.g., eNode B 210) to the other users in the cell.

In view of the example systems presented and described above, methodologies for resolving handover based at least in part on uplink channel state information that may be implemented in accordance with the disclosed subject matter will be better appreciated with reference to the flowcharts of FIGS. 9-12. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology may alternatively be represented as a series of interrelated states or events, such as in a state diagram. In addition, a methodology derived from a combination of at least portions of disparate methodologies may be represented as an interaction diagram or a call flow rather than through flow chart(s).

Figure 9:
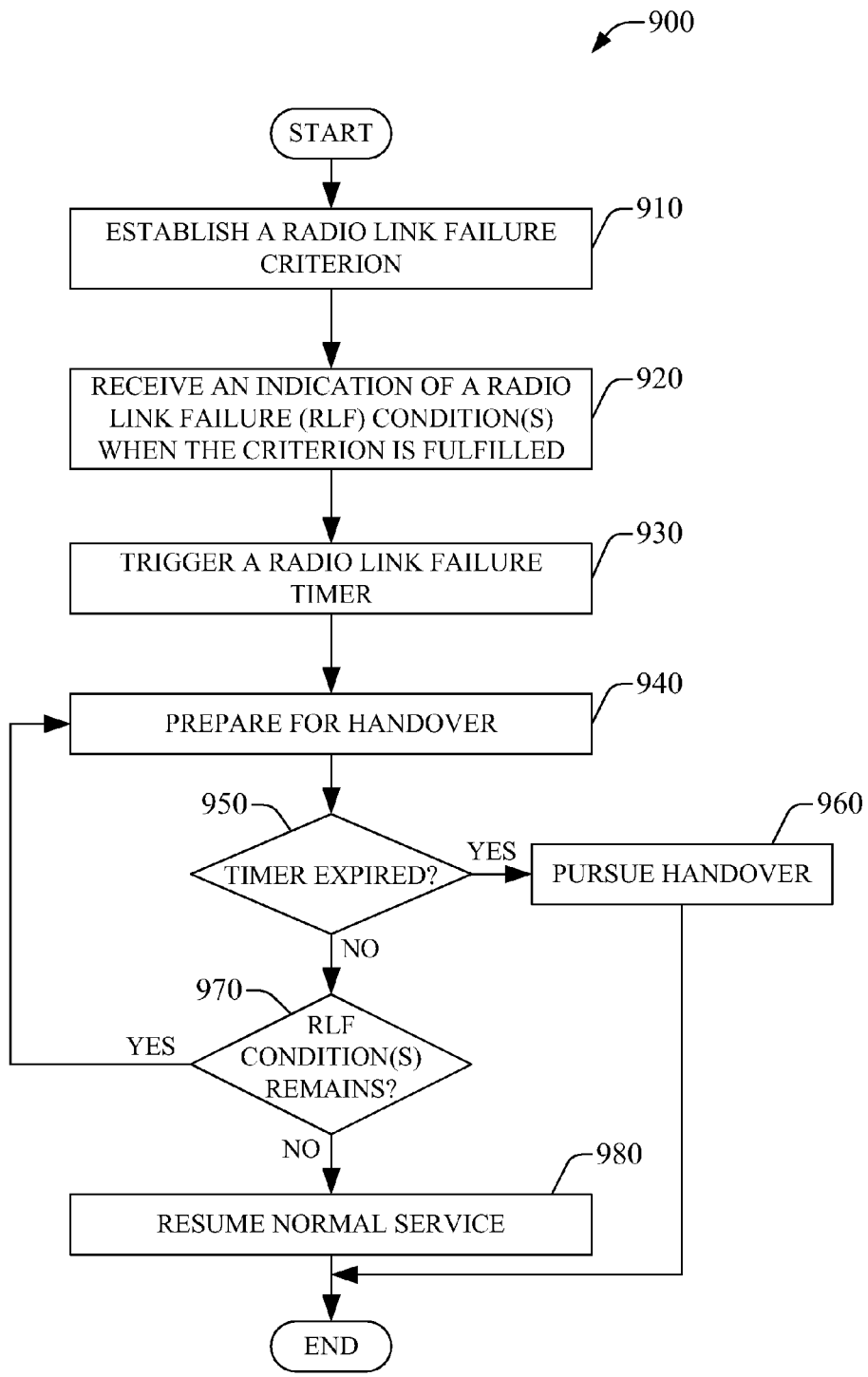
FIG. 9 is a flowchart of an example method for preparing for preparing for handover upon radio link failure according to aspects described in the subject specification.

FIG. 9 is a flowchart of an example method 900 for preparing for preparing for handover upon radio link failure. In an aspect, example method 900 can be performed by a serving base station (e.g., eNode B 210). At act 910, a radio link failure criterion is established; e.g., a criterion is defined and conveyed to wireless network components (e.g., a mobile station). As an example, RLF criterion can be configured by a network operator via a network management component (e.g., mobility management entity, or a base station). The RLF criterion can be based on a channel signal strength metric, or channel quality metric, like SNR, SINR, C/I, RSOT, and so forth. At act 920 an indication of a radio link failure is received when the RLF criterion is fulfilled. In another aspect, such an indication is generally conveyed by an access terminal served by a base station that established the RLF criterion. At act 930, a radio link failure timer is triggered. The RLF timer can span a predetermined time interval allotted for conducting a handover. During the allotted time for the RLF time, service is retained and handover can be prepared, thus ensuring mobility without substantial service disruption. At act 940, handover is prepared. Such preparation can include scheduling changes (e.g., implemented by a serving base station), target cell system information communication, communication of context, and so on. As an example, a serving eNode B 210 can configure potential target eNBs with a mobile's context. Selection of potential target eNBs can be based on historic data and measurements or statically configured by the network. In an aspect, such preparation can complement handover preparation initiated in advance to RLF in order to ensure critical operational information is preconfigured prior to reaching a link failure condition. In an aspect, the extent to which advanced preparation occurs can be dictated by a threshold associated with message-based measurement reports conveyed by a served mobile terminal. At act 950, it is checked whether RLF timer has expired, for example by having elapsed a time interval greater that a predetermined upper bound (e.g., $\tau_1$ 316). Upon timer expiration, forward handover is pursued at act 960, wherein pursuing handover can include synchronizing with a target cell, conveying a forward handover request and receiving a forward handover request acknowledgement. When RLF timer has failed to expire, it is checked at act 970 whether RLF condition(s) remains. In the affirmative case, normal service is resumed at act 980. It should be appreciated that normal service can include resuming scheduling traffic for a terminal that reported a radio link failure condition, or halting communication of buffering data to a set of target cells, and so forth. Moreover, in view of handover preparations, service can be resumed through a candidate target cell. Conversely, preparation(s) for handover proceeds at act 940.

Figure 10:
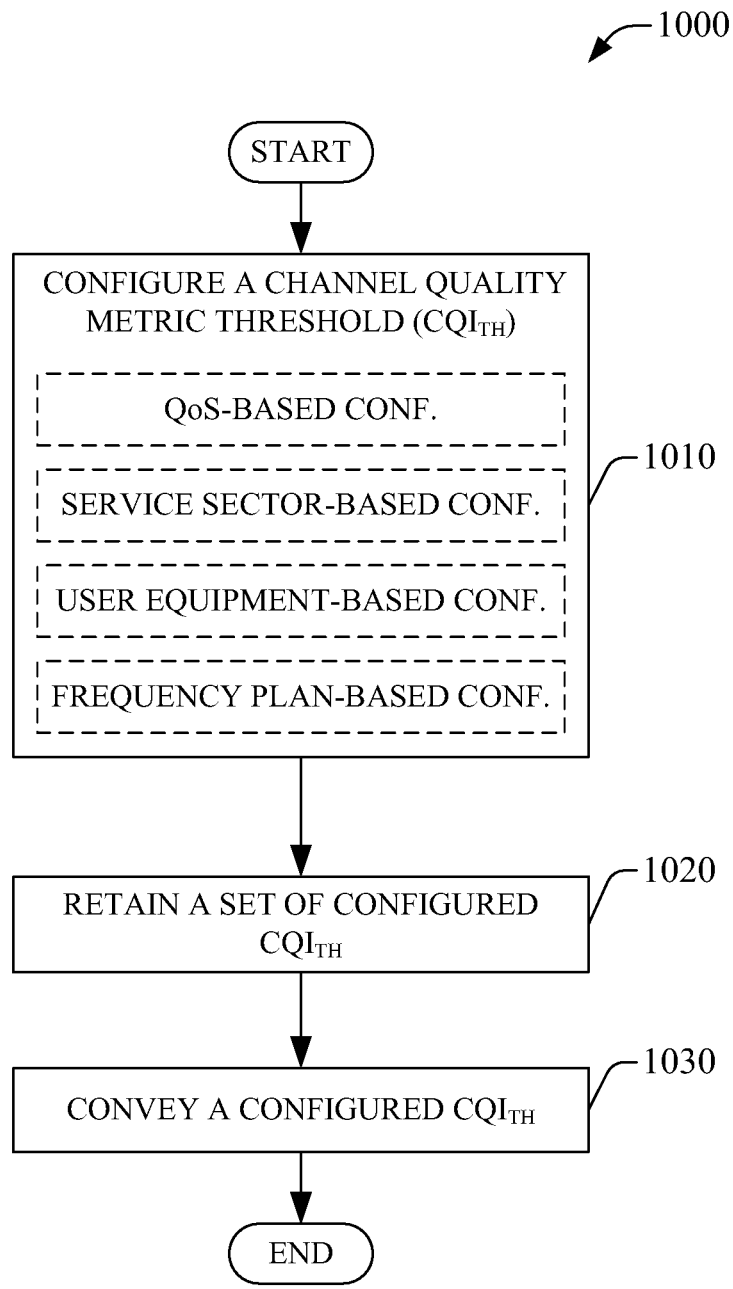
FIG. 10 is a flowchart of an example method for establishing a radio link failure criterion according to aspects of the subject innovation described herein.

FIG. 10 is a flowchart of an example method 1000 for establishing a radio link failure criterion. In an example, a network operator can configure the RLF criterion and utilize it as a part of handover algorithms to trigger both forward and backward handover. At act 1010, a channel quality metric threshold $CQI_{TH}$ is configured. It is to be noted that multiple values of $CQI_{TH}$ can be configured. Various metrics can be utilized, for instance: RSOT, RSSI, RSRP, SINR, and so forth. Such configuration can implemented on a per-terminal basis, a per-flow basis, or a per-subscriber basis. Additionally, threshold(s) $CQI_{TH}$ can be time dependent. More particularly, $CQI_{TH}$ can be determined based at least in part on (1) QoS specifications such as GBR, ABR, BER, PER, BLER, traffic handling priority which typically determines scheduling priorities—generally dictated by channel quality indicators in a served mobile station; (2) service sector or other spatial criteria; (3) user equipment capabilities or mode of operation; and (4) frequency planning such operational bandwidth, allocated frequency bands, frequency reuse, etc. In an aspect, configuration of $CQI_{TH}$ can be autonomously and dynamically optimized to mitigate latency associated with handover while retaining satisfactory service (e.g., low jitter level for voice sessions), for example by intelligent component 218. At act 1020, a set of configured $CQI_{TH}$ is retained. At act 1030, a configured $CQI_{TH}$ is conveyed. In an aspect, threshold $CQI_{TH}$ values are conveyed to an access terminal, which can employ them to indicate radio link failure and initiate FHO.

Figure 11:
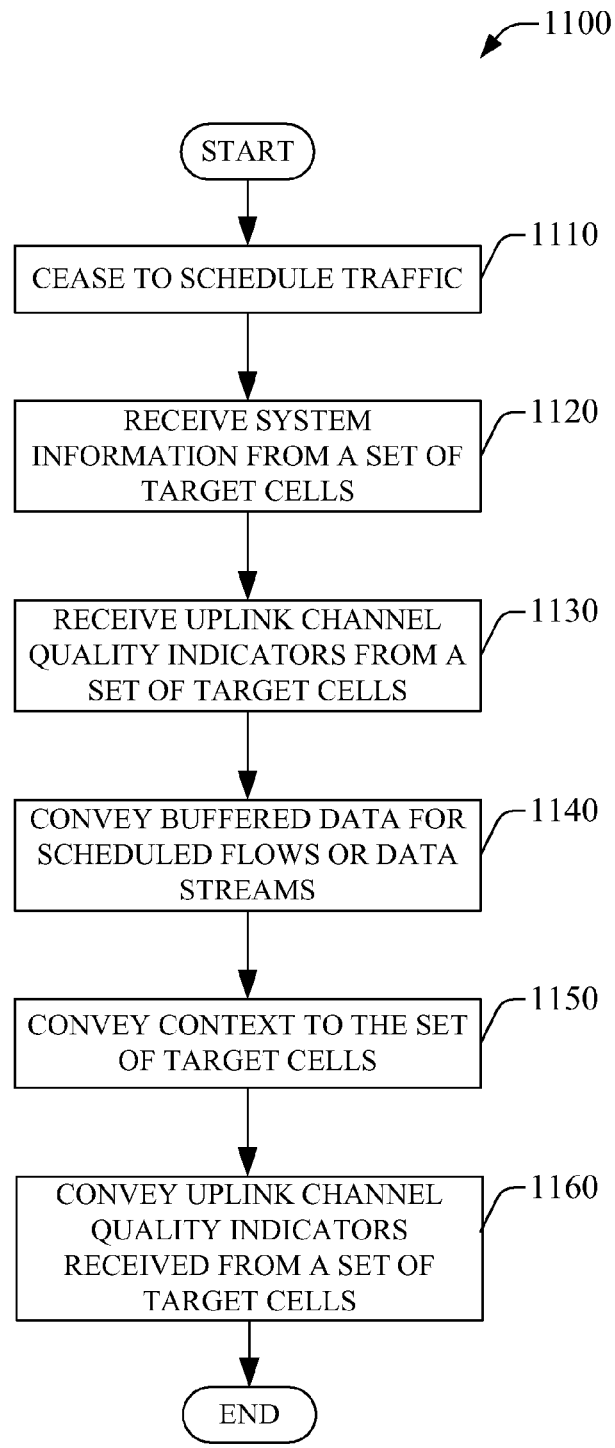
FIG. 11 presents a flowchart of an example method for preparing for forward handover under radio link failure according to aspects described herein.

FIG. 11 presents a flowchart of an example method 1100 for preparing for forward handover under radio link failure. In an aspect, example method 1100 is carried out by a serving base station (e.g., eNode B 210) upon receiving an indication of radio link failure (e.g., an indication of CQI=NULL). It is to be noted that example method 110 can be performed in substantially any situation in which FHO has been signaled. At act 1110, traffic ceases to be scheduled. As an indication of handoff is received (e.g., radio link failure condition incurred), a serving eNode B can continue to transmit buffered data (e.g., packets), however, as service is expected to be handed over, scheduling of newly generated data is unwarranted. At act 1120 system information is received from a set of target cells. In an aspect, information is received through a backhaul network communication backbone (e.g., link 135; identified as X2 interface in LTE). System information can comprise for example, target cell system bandwidth; cell identity; pilot sequences (e.g., root indices for Zadoff-Chu codes) utilized for synchronization, UL sounding reference(s), and DL reference signals; physical random access channel (PRACH) configuration (e.g., preamble size, or preamble content), or management frame(s) configuration; symbol and cyclic prefix timing; allocated power or power density; etc. At act 1130, UL channel quality indicators from a set of target cells are received. At act 1140, buffered data for scheduled data flows of data streams is conveyed. Typically, the set of target cells that transmitted the system information receive the buffered data to ensure data integrity, which can be particularly critical for specific applications such as encrypted data transfer, or mission-critical applications like video-streaming in remote surgical or technical procedures. At act 1150, context is conveyed to the set of target cells. Context generally refers to service (e.g., Multimedia Broadcast Multimedia Service, security, billing,) context of a mobile station that prepares to implement FHO. At act 1160, uplink channel quality indicators received from a set of target cells are conveyed. In an aspect, such UL CQI can be employed by a mobile to determine an adequate target cell to attach to.

Figure 12:
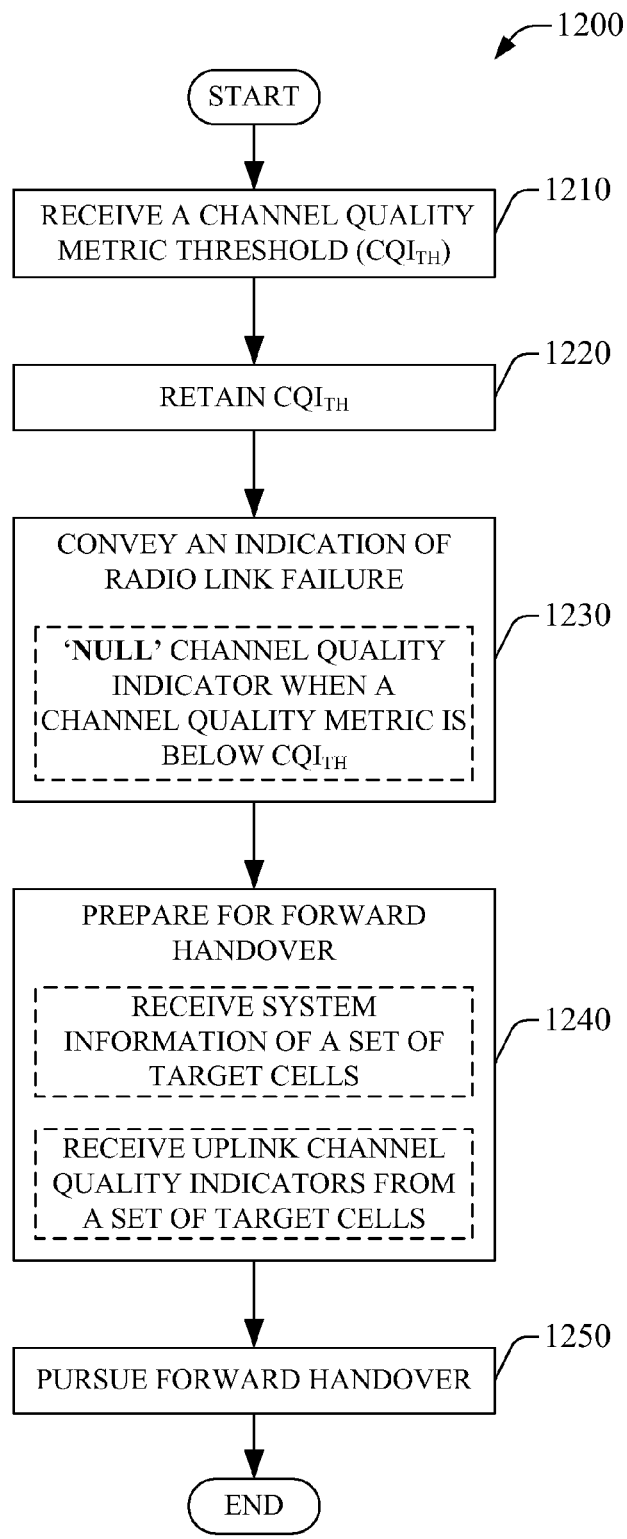
FIG. 12 presents a flowchart of an example method for preparing for forward handover under radio link failure according to aspects set forth herein.

FIG. 12 presents a flowchart of an example method 1200 for preparing for forward handover under radio link failure. The example method 1200 is typically performed by a mobile station (e.g. user equipment 250), as it typically is the situation with FHO. At act 1210 a channel quality metric threshold $CQI_{TH}$ is received. Various channel quality metrics can be utilized such as RSOT, RSSI, RSRP, SINR, and so forth. In an aspect, $CQI_{TH}$ establishes a radio link failure condition, even under communication conditions in which service can be retained. It should be appreciated, in an aspect, that multiples values of $CQI_{TH}$ can be received according to flows scheduled for the terminal receiving $CQI_{TH}$, the location of the terminal in a coverage cell or sector, the mode of operation of the terminal, and so forth. It is to be noted that $CQI_{TH}$ can be time dependent. At act 1220, received value(s) of $CQI_{TH}$ is retained. Threshold value(s) can be retained, for example in a memory connected to a handover component (e.g., handover component 265) in the mobile station that receives $CQI_{TH}$. At act 1230, an indication of radio link failure is conveyed. In an aspect, in LTE, such indication is communicated on the physical uplink control channel (PUCCH), while in control-less wireless technologies such as IEEE 802.11x, the indication can be conveyed on in-band management frames. Indication of radio link failure can be signaling of CQI=NULL when a channel quality metric associated with the metric that determines RLF is below $CQI_{TH}$. At act 1240, a preparation for forward handover is conducted. Preparation includes receiving system information of a set of target cells. The received system information facilitates preparing for forward handover, and it can comprise, for example, target cell system bandwidth, cell identity, pilot sequences (e.g., root indices for Zadoff-Chu codes) utilized for synchronization, symbol and cyclic prefix timing, allocated power or power density, etc. Processing of received system information can involve decoding of Q bits (Q a positive integer; with Q~O(10 bits) per target cell, for example). In addition, preparation for forward handover includes receiving uplink channel quality indicators for a set of target cells. At act 1250, forward handover (FHO) is pursued, which typically comprise handover signaling, e.g., FHO request, FHO request acknowledge, and reception of UL/DL resource grant(s) among a selected target cell and a mobile station (e.g., UE 250) that pursues FHO.

Figure 13:
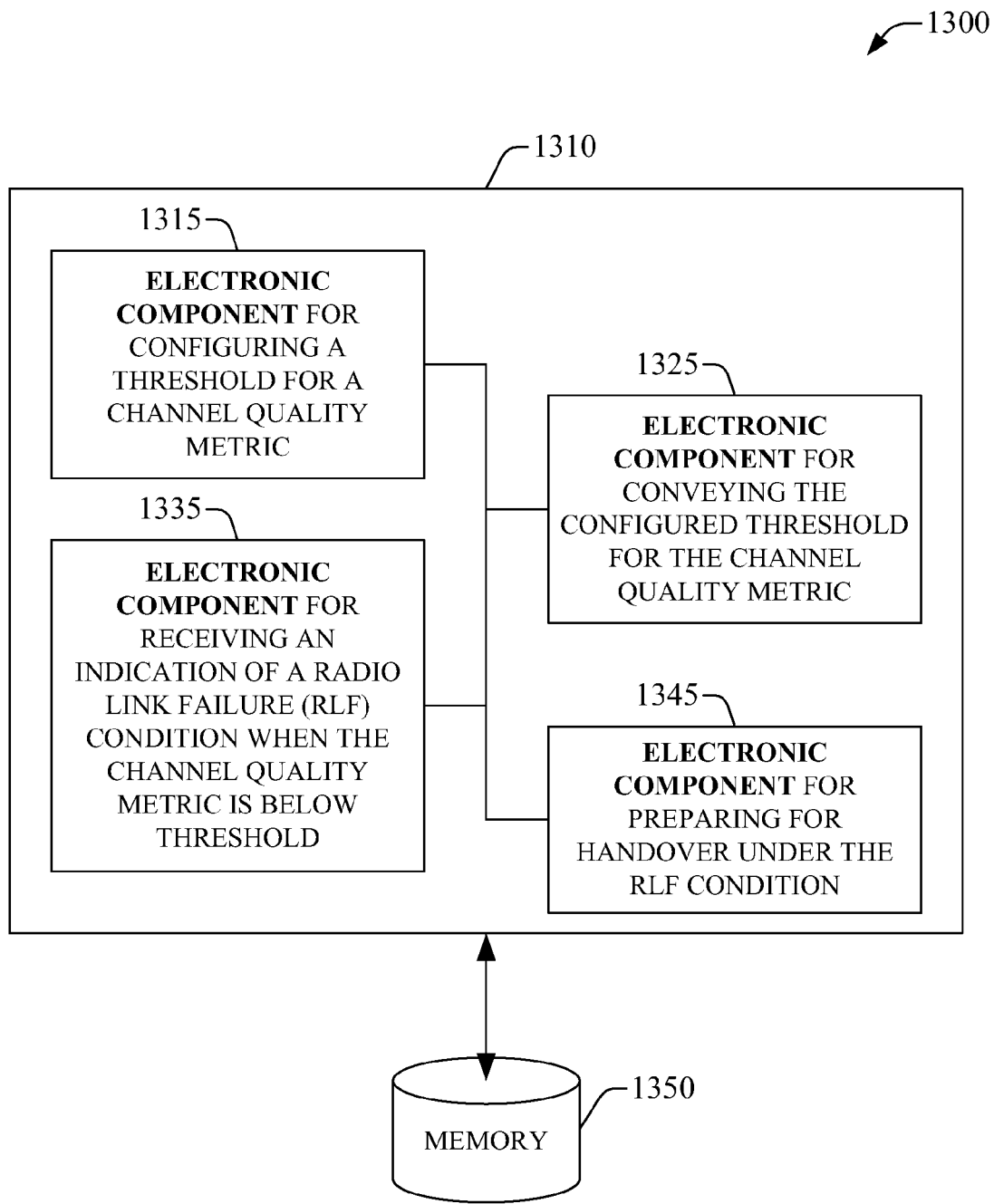
FIG. 13 illustrates a block diagram of an example system that enables establishing a criterion for radio link failure in accordance with aspects disclosed in the subject specification.

FIG. 13 illustrates a block diagram of an example system 1300 that enables establishment a criterion for radio link failure in accordance to aspects disclosed in the subject specification. System 1300 can reside, at least partially, within a base station (e.g., eNode B 210). System 1100 includes a logical grouping 1310 of electronic components that can act in conjunction. In an aspect, logical grouping 1310 includes an electronic component 1315 for configuring a threshold for a channel quality metric: an electronic component 1325 for conveying the configured threshold for the channel quality metric; and an electronic component 1335 for receiving an indication of a radio link failure (RLF) condition when the channel quality metric is below threshold. In addition, system 1300 can include electronic component 1345 for preparing for handover under the RLF condition.

System 1300 can also include a memory 1350 that retains instructions for executing functions associated with electrical components 1315, 1325, 1335, and 1345, as well as measured or computed data that may be generated during executing such functions. While shown as being external to memory 1180, it is to be understood that one or more of electronic components 1115, 1125, and 1135, 1145, 1155, 1165, and 1175 can exist within memory 1180.

Figure 14:
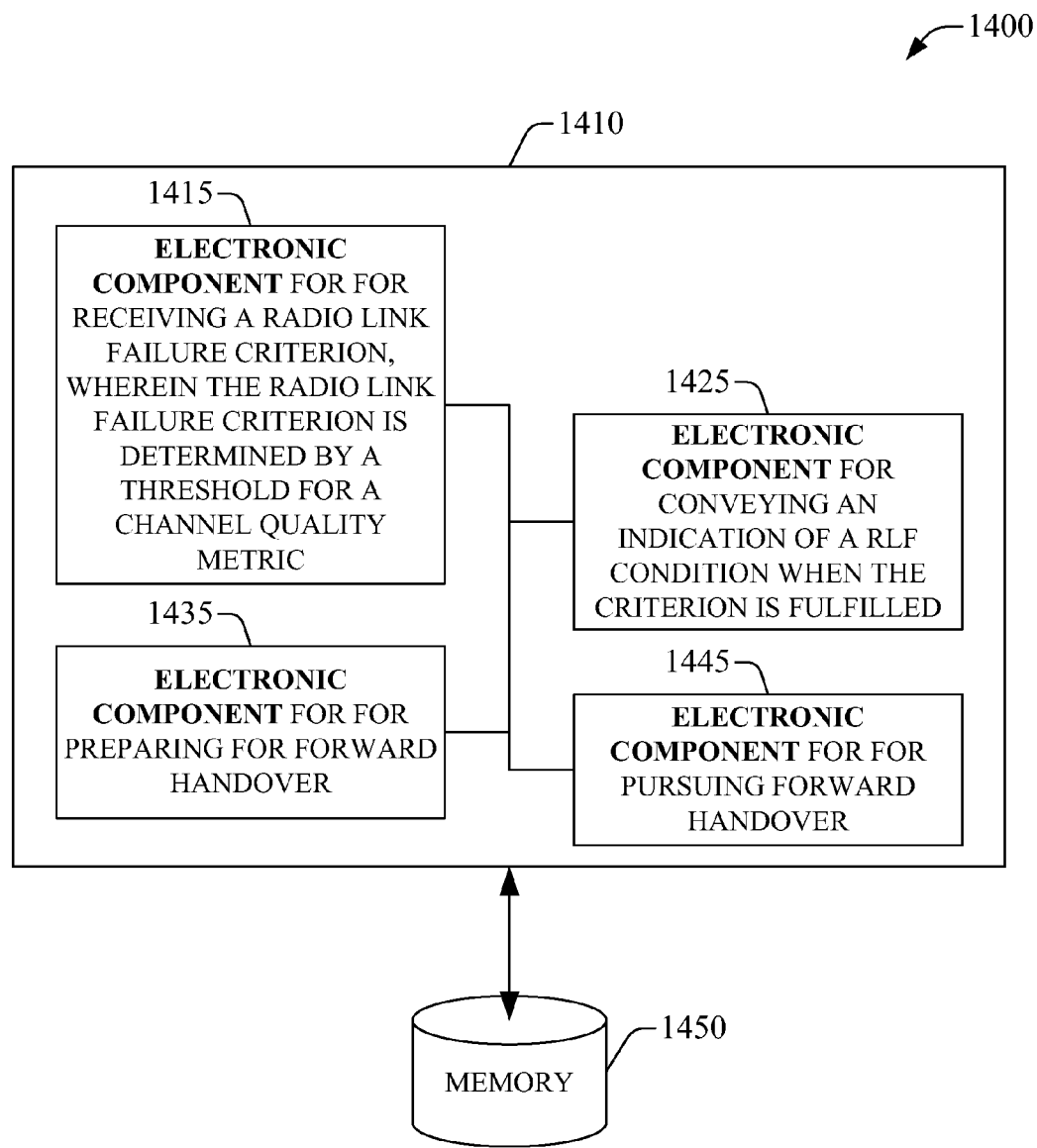
FIG. 14 illustrates a block diagram of an example system that enables utilization of an RLF indication to implement handover in accordance with aspect described in the subject specification.

FIG. 14 illustrates a block diagram of an example system 1400 that enables utilization of an RLF indication to implement handover. System 1400 can reside, at least partially, within a mobile (e.g., user equipment 250). System 1400 includes a logical grouping 1410 of electronic components that can act in conjunction. In an aspect, logical grouping 1410 includes an electronic component 1415 for receiving a radio link failure criterion, wherein the radio link failure criterion is determined by a threshold for a channel quality metric; an electronic component 1425 for conveying an indication of a RLF condition when the criterion is fulfilled; and an electronic component 1435 for preparing for forward handover. In addition, system 1400 can include electronic component 1445 for pursuing forward handover.

System 1400 can also include a memory 1450 that retains instructions for executing functions associated with electrical components 1415, 1425, 1435, and 1445, as well as measured or computed data that may be generated during executing such functions. While shown as being external to memory 1450, it is to be understood that one or more of electronic components 1415, 1425, 1435, and 1445, and can exist within memory 1450.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2).

For a software implementation, the techniques described herein may be implemented with modules (e.g., procedures, functions, and so on) that perform the functions described herein. The software codes may be stored in memory units, or memories, and executed by processors. A memory unit, or memory, may be implemented within the processor or external to the processor, in which case it can be communicatively coupled to the processor via various conventional means.

Various aspects or features described herein may be implemented as a method, apparatus, or article of manufacture employing standard programming and/or engineering techniques. The term "article of manufacture" as utilized herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to include, wireless channels and various other media capable of storing, containing, and/or carrying instruction(s) and/or data.

As it employed herein, the term "processor" can refer to a classical architecture or a quantum computer. Classical architecture comprises, but is not limited to comprise, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification and annexed drawings, the term "memory" refers to data stores, algorithm stores, and other information stores such as subscriber databases, billings databases, or specification/content stores. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the terms "includes," "including," "possess," "possessing," and the like are used in the subject specification, such terms are intended to be inclusive in a manner similar to the term "comprising" as "comprising" is interpreted when employed as a transitional word in a claim.

What is claimed is:

1. A method for facilitating handover in wireless system, the method comprising:
    establishing a radio link failure (RLF) criterion by configuring an autonomously optimized threshold for a channel quality metric;
    receiving an indication of a radio link failure (RLF) condition when the RLF criterion is fulfilled, wherein the indication of the RLF condition includes a NULL channel quality indicator of RLF onset;
    triggering a RLF timer upon receiving the indication, wherein the RLF timer is selected to mitigate excessive forward handover pursuits and ensuing target cell attachments; and
    triggering preparation for handover in response to the NULL channel quality indicator of RLF onset.

2. The method of claim 1, wherein establishing the RLF criterion comprises conveying the threshold for the channel quality metric.

3. The method of claim 1, wherein configuring the threshold for the channel quality metric is based at least on one of a quality of service, a service sector, a user equipment, or a frequency plan.

4. The method of claim 3, wherein the quality of service includes at least one of a guaranteed bitrate, an average bitrate, a minimum bitrate, a block error rate, a packet error rate, a bit error rate, or a peak data rate.

5. The method of claim 3, wherein establishing the RLF criterion further comprises retaining a set of configured channel quality metric thresholds.

6. The method of claim 3, wherein configuring the threshold for the channel quality metric based on the user equipment comprises configuring based on one of a data flow, a mode of operation, or a user equipment capability.

7. The method of claim 6, wherein the channel quality metric includes one of a reference signal received power, a reference signal strength indicator, a reference signal over thermal noise, or a signal to noise and interference ratio.

8. The method of claim 1, wherein the preparation for handover comprises ceasing to schedule traffic.

9. The method of claim 8, wherein the preparation for handover further comprises receiving system information from a set of target cells.

10. The method of claim 9, wherein the preparation for handover further comprises receiving a set of uplink channel quality indicators from a set of target base stations.

11. The method of claim 10, wherein the preparation for handover further comprises conveying buffered data.

12. The method of claim 11, wherein the preparation for handover further comprises conveying context to the set of target cells.

13. The method of claim 12, wherein the preparation for handover further comprises conveying uplink channel quality indicators received from the set of target cells.

14. The method of claim 1, further comprising evaluating whether the RLF timer has expired and pursuing forward handover when the timer has expired.

15. The method of claim 14, when the RLF timer has failed to elapse, further comprising evaluating whether the RLF condition remains and resuming a normal operation for wireless communication when the RLF condition ceases to exist.

16. A device that operates in a wireless environment, the device comprising:
   a processor configured
      to set a configurable and autonomously optimized threshold for a channel quality metric;
      to receive an indication of a radio link failure (RLF) condition when a channel quality metric is below the threshold, wherein the indication of the RLF condition includes a NULL channel quality indicator of RLF onset;
      to trigger a RLF timer upon receiving the indication, and wherein the RLF timer is selected to mitigate excessive forward handover pursuits and ensuing target cell attachments; and
      to trigger preparation for handover in response to the NULL channel quality indicator of RLF onset; and
   a memory coupled to the processor.

17. The device of claim 16, wherein the processor is further configured to convey the threshold for the channel quality metric.

18. The device of claim 16, wherein the threshold for the channel quality metric is based at least on one of a quality of service, a service sector, a user equipment, or a frequency plan.

19. The device of claim 18, wherein the quality of service includes at least one of a guaranteed bitrate, an average bitrate, a minimum bitrate, a block error rate, a packet error rate, a bit error rate, or a peak data rate.

20. The device of claim 19, wherein a configuration of the threshold for the channel quality metric based on the user equipment comprises a configuration based on one of a data flow, a mode of operation, or a user equipment capability.

21. The device of claim 20, wherein the channel quality metric includes one of a reference signal received power, a reference signal strength indicator, a reference signal over thermal noise, or a signal to noise and interference ratio.

22. The device of claim 16, wherein to trigger preparation for handover in response to the NULL channel quality indicator of RLF onset further comprises to convey context to a set of target cells.

23. The device of claim 22, wherein to trigger preparation for handover in response to the NULL channel quality indicator of RLF onset further comprises to convey buffered data.

24. The device of claim 23, wherein to trigger preparation for handover in response to the NULL channel quality indicator of RLF onset further comprises to receive a set of uplink channel quality indicators from a set of target base stations.

25. The device of claim 24, wherein to trigger preparation for handover in response to the NULL channel quality indicator of RLF onset comprises to cease to schedule traffic.

26. The device of claim 25, wherein to trigger preparation for handover in response to the NULL channel quality indicator of RLF onset further comprises conveying uplink channel quality indicators received from the set of target cells.

27. The device of claim 16, wherein the processor is further configured to evaluate whether the RLF timer has expired and to disrupt a communication service when said RLF timer has expired.

28. The device of claim 27, when the RLF timer has failed to elapse, the processor further configured to evaluate whether the RLF condition remains and to resume a normal operation for wireless communication when the RLF condition ceases to exist.

29. The device of claim 28, wherein the memory stores a set of configured thresholds for a set of channel quality metrics.

30. An apparatus that operates in a wireless environment, the apparatus comprising:
   means for configuring an autonomously optimized threshold for a channel quality metric;
   means for conveying the threshold for the channel quality metric;
   means for receiving an indication of a radio link failure (RLF) condition when a channel quality metric is below threshold, wherein the indication of the RLF condition includes a NULL channel quality indicator of RLF onset;
   means for triggering a RLF timer upon receiving the indication, wherein the RLF timer is selected to mitigate excessive forward handover pursuits and ensuing target cell attachments; and
   means for triggering preparation for handover in response to the NULL channel quality indicator of RLF onset.

31. A non-transitory computer-readable medium storing a computer program, wherein execution of the computer program is for:
   configuring an autonomously optimized threshold for a channel quality metric to determine a radio link failure (RLF) criterion;
   conveying the threshold for the channel quality metric;
   receiving an indication of a radio link failure (RLF) condition when the channel quality metric is below threshold, wherein the indication of the RLF condition includes a NULL channel quality indicator of RLF onset;
   triggering a RLF timer upon receiving the indication, wherein the RLF timer is selected to mitigate excessive forward handover pursuits and ensuing target cell attachments; and
   triggering preparation for handover in response to the NULL channel quality indicator of RLF onset.

32. The non-transitory computer-readable medium of claim 31, wherein the threshold for the channel quality metric is based at least on one of a quality of service, a service sector, a user equipment, or a frequency plan.

33. A method for forward handover under link failure in a wireless system, the method comprising:
   receiving a configurable channel quality metric threshold, the channel quality metric threshold being autonomously optimized and establishes a radio link failure (RLF) criterion;
   conveying an indication of a RLF condition when a channel quality metric is below the threshold, wherein the indication of the RLF condition includes a NULL channel quality indicator of RLF onset, and reception of the indication triggers an RLF timer selected to mitigate excessive forward handover pursuits and ensuing target cell attachments;
   preparing for forward handover triggered by the NULL channel quality indicator of RLF onset; and
   pursuing forward handover.

34. The method of claim 33, wherein the configurable channel quality metric threshold is based at least on one of a quality of service, a service sector, a user equipment, or a frequency plan.

35. The method of claim 34, wherein the quality of service includes at least one of a guaranteed bitrate, an average bitrate, a minimum bitrate, a block error rate, a packet error rate, a bit error rate, or a peak data rate.

36. The method of claim 35, wherein a configuration of the channel quality metric threshold based on the user equipment comprises a configuration based on one of a data flow, a mode of operation, or a user equipment capability.

37. The method of claim 33, wherein preparing for forward handover includes receiving a set of uplink channel quality indicators from the set of target cells.

38. The method of claim 33, wherein pursuing forward handover comprises:
synchronizing with a target cell; and
conveying a forward handover request and receiving a forward handover request acknowledgement.

39. The method of claim 33, further comprising retaining the channel quality threshold.

40. An apparatus that operates in a wireless environment, the apparatus comprising:
a processor configured
to receive a channel quality metric threshold which determines a radio link failure (RLF) criterion and wherein the channel quality metric threshold is autonomously optimized;
to generate a channel quality metric;
to convey a channel quality indicator (CQI) report that indicates a RLF condition as a NULL channel quality indicator of RLF onset when the channel quality metric is below the channel quality metric threshold, wherein reception of the CQI report triggers an RLF timer selected to mitigate excessive forward handover pursuits and ensuing target cell attachments; and
to prepare for forward handover triggered by the NULL channel quality indicator of RLF onset; and
memory coupled to the processor.

41. The apparatus of claim 40, wherein the processor is further configured to pursue forward handover.

42. The apparatus of claim 41, wherein to pursue forward handover comprises
to synchronize with a target cell; and
to convey a forward handover request and receiving a forward handover request acknowledgement.

43. The apparatus of claim 42, wherein the channel quality metric includes one of a reference signal received power, a reference signal strength indicator, a reference signal over thermal noise, or a signal to noise and interference ratio.

44. The apparatus of claim 40, wherein the processor configured to prepare for forward handover is further configured to receive system information of a set of target cells; and to receive a set of uplink channel quality indicators from the set of target cells.

45. The apparatus of claim 44, wherein the memory stores the received channel quality metric threshold.

46. A wireless device comprising:
means for receiving a radio link failure (RLF) criterion, wherein the RLF criterion is determined by an autonomously optimized threshold for a channel quality metric;
means for conveying an indication of a RLF condition as a NULL channel quality indicator of RLF onset when the RLF criterion is fulfilled, wherein reception of the indication triggers an RLF timer selected to mitigate excessive forward handover pursuits and ensuing target cell attachments;
means for preparing for forward handover triggered by the NULL channel quality indicator of RLF onset; and
means for pursuing forward handover.

47. The wireless device of claim 46, wherein the RLF criterion is fulfilled when the channel quality metric is below the threshold.

48. The wireless device of claim 46, wherein the means for preparing for forward handover includes means for receiving a set of uplink channel quality indicators from the set of target cells.

49. The wireless device of claim 47, wherein the means for pursuing forward handover comprises:
means for synchronizing with a target cell; and
means for conveying a forward handover request and receiving a forward handover request acknowledgement.

50. A non-transitory computer readable medium storing a computer program, wherein execution of the computer program is for:
receiving a channel quality metric threshold, wherein the channel quality metric threshold is autonomously optimized;
conveying an indication of a radio link failure (RLF) condition as a NULL channel quality indicator of RLF onset when a channel quality metric is below the channel quality metric threshold, wherein reception of the indication triggers an RLF timer selected to mitigate excessive forward handover pursuits and ensuing target cell attachments; and
pursuing forward handover triggered by the NULL channel quality indicator of RLF onset.

51. The non-transitory computer readable medium of claim 50, wherein execution of the computer program is also for:
synchronizing with a target cell; and
conveying a forward handover request and receiving a forward handover request acknowledgement.

52. The non-transitory computer-readable medium of claim 51 wherein execution of the computer program is also for preparing for forward handover.

53. The non-transitory computer readable medium of claim 52, wherein execution of the computer program is also for:
receiving system information of a set of target cells; and
receiving a set of uplink channel quality indicators from the set of target cells.

* * * * *